United States Patent
Kundu et al.

(10) Patent No.: US 11,373,532 B2
(45) Date of Patent: Jun. 28, 2022

(54) POTHOLE DETECTION SYSTEM

(71) Applicant: Hitachi Automotive Systems, Ltd., Hitachinaka (JP)

(72) Inventors: Subrata Kumar Kundu, Canton, MI (US); Naveen Kumar Bangalore Ramaiah, Farmington Hills, MI (US)

(73) Assignee: HITACHI ASTEMO, LTD., Ibaraki (JP)

( * ) Notice: Subject to any disclaimer, the term of this patent is extended or adjusted under 35 U.S.C. 154(b) by 749 days.

(21) Appl. No.: 16/265,913

(22) Filed: Feb. 1, 2019

(65) Prior Publication Data

US 2020/0250984 A1 Aug. 6, 2020

(51) Int. Cl.
*G08G 1/16* (2006.01)
*G01C 7/02* (2006.01)
(Continued)

(52) U.S. Cl.
CPC .............. *G08G 1/165* (2013.01); *B60W 40/06* (2013.01); *G01C 7/02* (2013.01); *G01S 13/867* (2013.01); *G01S 13/931* (2013.01); *G06V 20/58* (2022.01); *B60R 2300/105* (2013.01); *B60R 2300/301* (2013.01); *B60R 2300/8093* (2013.01); *B60W 2420/42* (2013.01); *G06T 2207/30261* (2013.01)

(58) Field of Classification Search
CPC .. B60W 10/20; B60W 30/09; B60W 30/0956; B60W 40/06; B60W 50/14; B60W 2050/143; B60W 2420/42; B60W 2552/35; B60R 2300/105; B60R 2300/301; B60R 2300/8093; G06T 2207/30261; G06V 10/44; G06V 20/56; G06V 20/58; G08G 1/165; G01S 13/867; G01S 13/931; G01S 2013/93271; G01S 2013/93272; G01C 7/02
See application file for complete search history.

(56) References Cited

U.S. PATENT DOCUMENTS 9,679,204 B2 6/2017 Hegemann et al.
2007/0128529 A1 6/2007 Kazaana
(Continued)

FOREIGN PATENT DOCUMENTS

JP 2016217084 A 12/2016
JP 2017-199178 A 11/2017
(Continued)

OTHER PUBLICATIONS

Fan et al. "Road surface 3D reconstruction based on dense subpixel disparity map estimation." IEEE Transactions on Image Processing 27.6 (2018): 3025-3035. (Year: 2018).*
(Continued)

*Primary Examiner* — Katrina R Fujita
(74) *Attorney, Agent, or Firm* — Procopio, Cory, Hargreaves & Savitch LLP

(57) ABSTRACT

Example implementations described herein are directed to depression detection on roadways (e.g., potholes, horizontal panel lines of a roadway, etc.) through using vision sensor to realize improved safety for advanced driver assistance systems (ADAS) and autonomous driving (AD). Example implementations described herein detect candidate depressions in the roadway in real time and adjust the control of the vehicle system according to the detected depressions.

15 Claims, 36 Drawing Sheets

(51) Int. Cl.
  *G01S 13/86* (2006.01)
  *G01S 13/931* (2020.01)
  *B60W 40/06* (2012.01)
  *G06V 20/58* (2022.01)

(56) References Cited

U.S. PATENT DOCUMENTS

| | | | |
|---|---|---|---|
| 2012/0078572 A1* | 3/2012 | Bando | G08G 1/0112 |
| | | | 702/150 |
| 2013/0155061 A1* | 6/2013 | Jahanshahi | G06T 15/00 |
| | | | 345/419 |
| 2014/0168001 A1 | 6/2014 | Agnew | |
| 2016/0325753 A1* | 11/2016 | Stein | G06K 9/46 |
| 2017/0004627 A1* | 1/2017 | Baloch | G06T 7/162 |
| 2018/0068495 A1* | 3/2018 | Chainer | B62D 15/025 |
| 2018/0215391 A1* | 8/2018 | Chen | G01N 33/42 |
| 2019/0001965 A1* | 1/2019 | Cho | B60W 40/06 |
| 2019/0248364 A1* | 8/2019 | Dastgir | B60W 10/18 |
| 2019/0325595 A1* | 10/2019 | Stein | G08G 1/165 |

FOREIGN PATENT DOCUMENTS

| | | |
|---|---|---|
| WO | 2012/086070 A1 | 6/2012 |
| WO | 2014/064990 A1 | 5/2014 |
| WO | 2018232198 A1 | 12/2018 |

OTHER PUBLICATIONS

International Search Report and Written Opinion of the International Searching Authority for related PCT application No. PCT/JP2019/049453 dated Mar. 24, 2020, 6 pages.

* cited by examiner

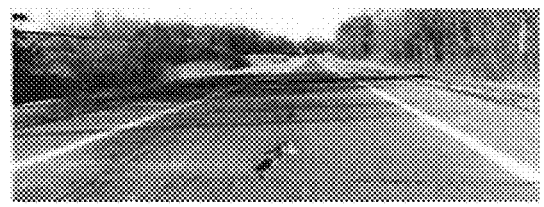
FIG. 1
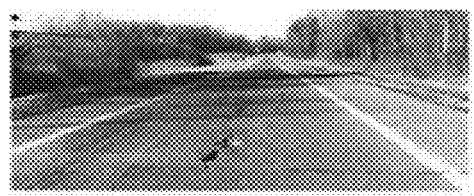 
FIG. 2(a)  FIG. 2(b)

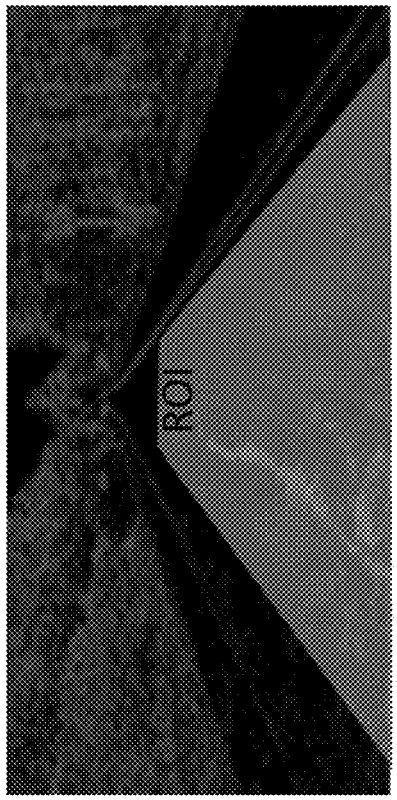
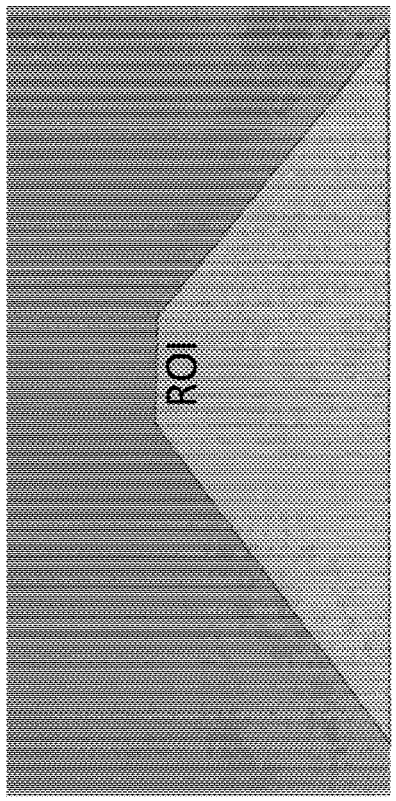
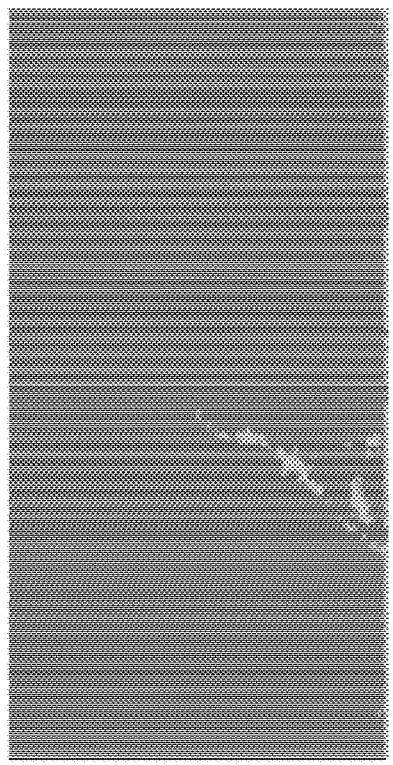
FIG. 6

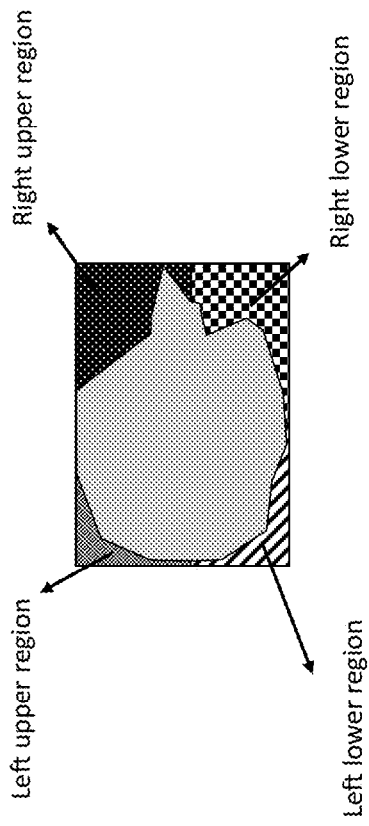
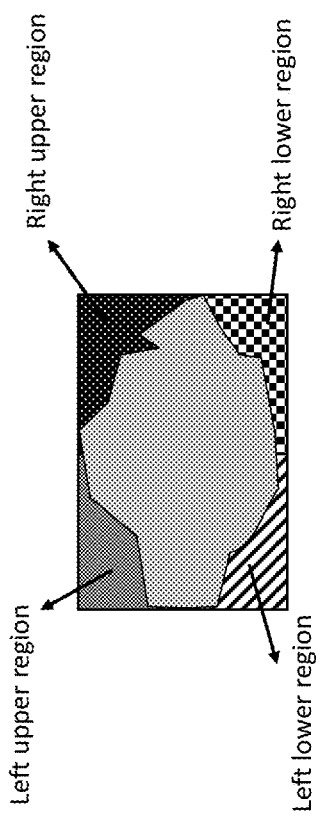
FIG. 14

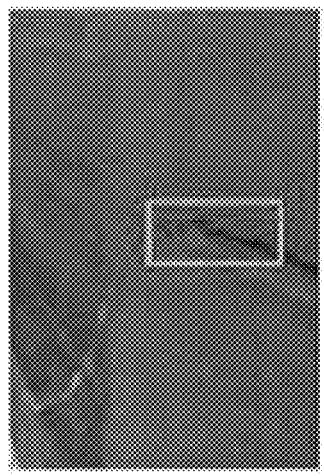
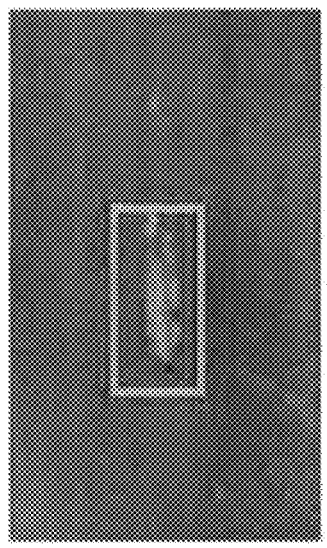
FIG. 26

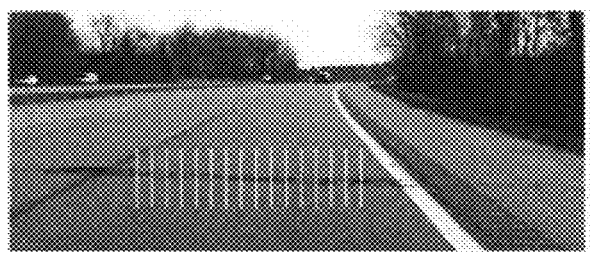
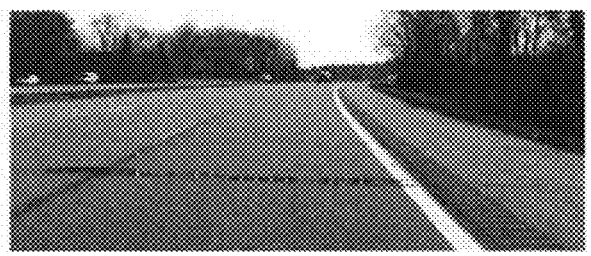
FIG. 29(a)          FIG. 29(b)
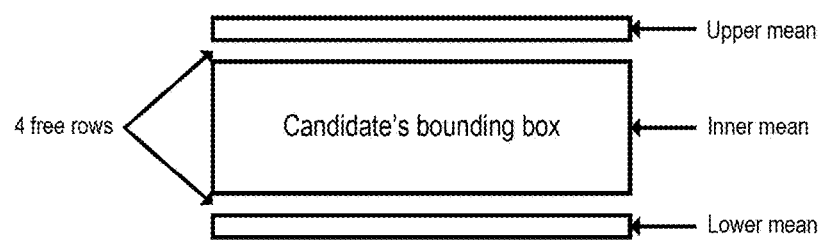
FIG. 30

Near depressions

| depression depth \ depression Size | Class 1 (too big) | Class 2 (medium) | Class 3 (too small) |
|---|---|---|---|
| Class 1 (too deep) | Steering control<br>Speed control | Steering control<br>Speed control | Spring + Damping co-efficient |
| Class 2 (intermediate) | Spring + Damping co-efficient<br>Speed control | Spring + Damping co-efficient<br>Speed control | Spring + Damping co-efficient |
| Class 3 (Shallow) | Spring + Damping co-efficient | Spring + Damping co-efficient | No change |

Far depressions

| depression depth \ depression Size | Class 1 (too big) | Class 2 (medium) | Class 3 (too small) |
|---|---|---|---|
| Class 1 (too deep) | Steering control | Steering control | Spring + Damping co-efficient |
| Class 2 (intermediate) | Spring + Damping co-efficient | Spring + Damping co-efficient | Spring + Damping co-efficient |
| Class 3 (Shallow) | Spring + Damping co-efficient | Spring + Damping co-efficient | No change |

FIG. 33

POTHOLE DETECTION SYSTEM

BACKGROUND

Field

The present disclosure relates generally to advanced driver assistance systems (ADAS) controllers, and more specifically, to systems configured to detect depressions in roadways, such as potholes and configure the ADAS controllers accordingly.

Related Art

As the automotive industry is racing towards a driverless future, there is a need to focus on providing safety to drivers as well as passengers. In related art versions of ADAS implementations such as adaptive cruise controller, pedestrian detection, lane departure warning system, and other applications ensuring driverless cars future is not far.

Physical sensors such as radar, LIDAR, cameras, and night-vision devices are often used which allows a vehicle to monitor near and far fields in every direction and of evolving and improving sensor fusion algorithms that ensure vehicle, driver, passenger, and pedestrian safety based on factors such as traffic, weather, dangerous conditions, and so on. Modern ADAS systems act in real time via warnings to the driver or by actuation of the control systems directly and are precursors to the autonomous vehicles of the future.

SUMMARY

There is a need for ADAS applications that provide safety along with comfort. In particular, depressions such as potholes are targeted, so that when the vehicle encounters such depressions in the roadway, the ADAS can control the vehicle to provide smooth driving experience through the depression by assisting suspension system while avoiding possible accidents and damages to the suspension system.

In particular, potholes refer to any type of road surface distress on an asphalt pavement that is more than 150 mm in diameter. Potholes are mostly generated during the winter and spring, because water often penetrates the pavement during these seasons. Since such types of depressions make driving less comfortable and in many cases can endanger drivers, (e.g., causing bumping or inducing a sudden stop by sudden breaking from drivers), there is a need to detect such depressions in the roadway from both safety and comfort point of view. Example implementations described herein are directed to utilizing a camera based system to detect depressions such as potholes and road cracks which could be used to assist suspension systems.

Pothole detection systems can improve safety and comfort driving experience by assisting ADAS controllers. The present disclosure involves systems and methods for detecting potholes and road cracks using camera systems that assist ADAS controllers to improve safety and comfort using detected pothole location and its depth. Although example implementations described herein are directed to potholes, any type of depression (e.g., road cracks, gaps in road/bridge panels, dips in the roadway, etc.) can also be detected through the example implementations herein.

Aspects of the present disclosure involve a method, which can include determining a difference image for images of a roadway received from one or more cameras of a vehicle; identifying one or more candidate depressions on the roadway from the difference image; classifying the one or more candidate depressions to determine types of depressions for each of the one or more candidate depressions based on a comparison to a negative Gaussian distribution; and controlling at least one of suspension, steering, or speed of the vehicle from the determined types of depressions for each of the one or more candidate depressions.

Aspects of the present disclosure involve a computer program, which can include instructions for determining a difference image for images of a roadway received from one or more cameras of a vehicle; identifying one or more candidate depressions on the roadway from the difference image; classifying the one or more candidate depressions to determine types of depressions for each of the one or more candidate depressions based on a comparison to a negative Gaussian distribution; and controlling at least one of suspension, steering, or speed of the vehicle from the determined types of depressions for each of the one or more candidate depressions. The computer program may be stored on a non-transitory computer readable medium and executed by one or more processors.

Aspects of the present disclosure involve a vehicle system, which can include means for determining a difference image for images of a roadway received from one or more cameras of the vehicle system; means for identifying one or more candidate depressions on the roadway from the difference image; means for classifying the one or more candidate depressions to determine types of depressions for each of the one or more candidate depressions based on a comparison to a negative Gaussian distribution; and means for controlling at least one of suspension, steering, or speed of the vehicle from the determined types of depressions for each of the one or more candidate depressions.

Aspects of the present disclosure involve a vehicle system, involving one or more cameras; and a processor, configured to determine a difference image for images of a roadway received from one or more cameras of a vehicle; identify one or more candidate depressions on the roadway from the difference image; classify the one or more candidate depressions to determine types of depressions for each of the one or more candidate depressions based on a comparison to a negative Gaussian distribution; and instruct an Electronic Controller Unit (ECU) to control at least one of suspension, steering, or speed of the vehicle system from the determined types of depressions for each of the one or more candidate depressions.

BRIEF DESCRIPTION OF DRAWINGS

FIG. 1 illustrates an example image from a camera system from a mono camera in accordance with an example implementation.

FIGS. 2(a) and 2(b) illustrate example images from a stereo or multiple camera system, in accordance with an example implementation.

FIG. 6 illustrates a disparity image, an edge image, and a segmented image with potential pothole candidates, in accordance with an example implementation.

FIG. 14 illustrates an example of dividing extracted candidates based on different cases, in accordance with an example implementation.

FIG. 26 illustrates examples of detected potholes and road cracks using the proposed depth and intensity classifier.

FIGS. 29(a) and 29(b) illustrate an example input and output of candidate extraction, in accordance with an example implementation.

FIG. 30 illustrates an example of region dividing to determine horizontal road cracks, in accordance with an example implementation.

FIG. 33 illustrates an example decision table for a vehicle controller system, in accordance with an example implementation.

DETAILED DESCRIPTION

Figure 3:
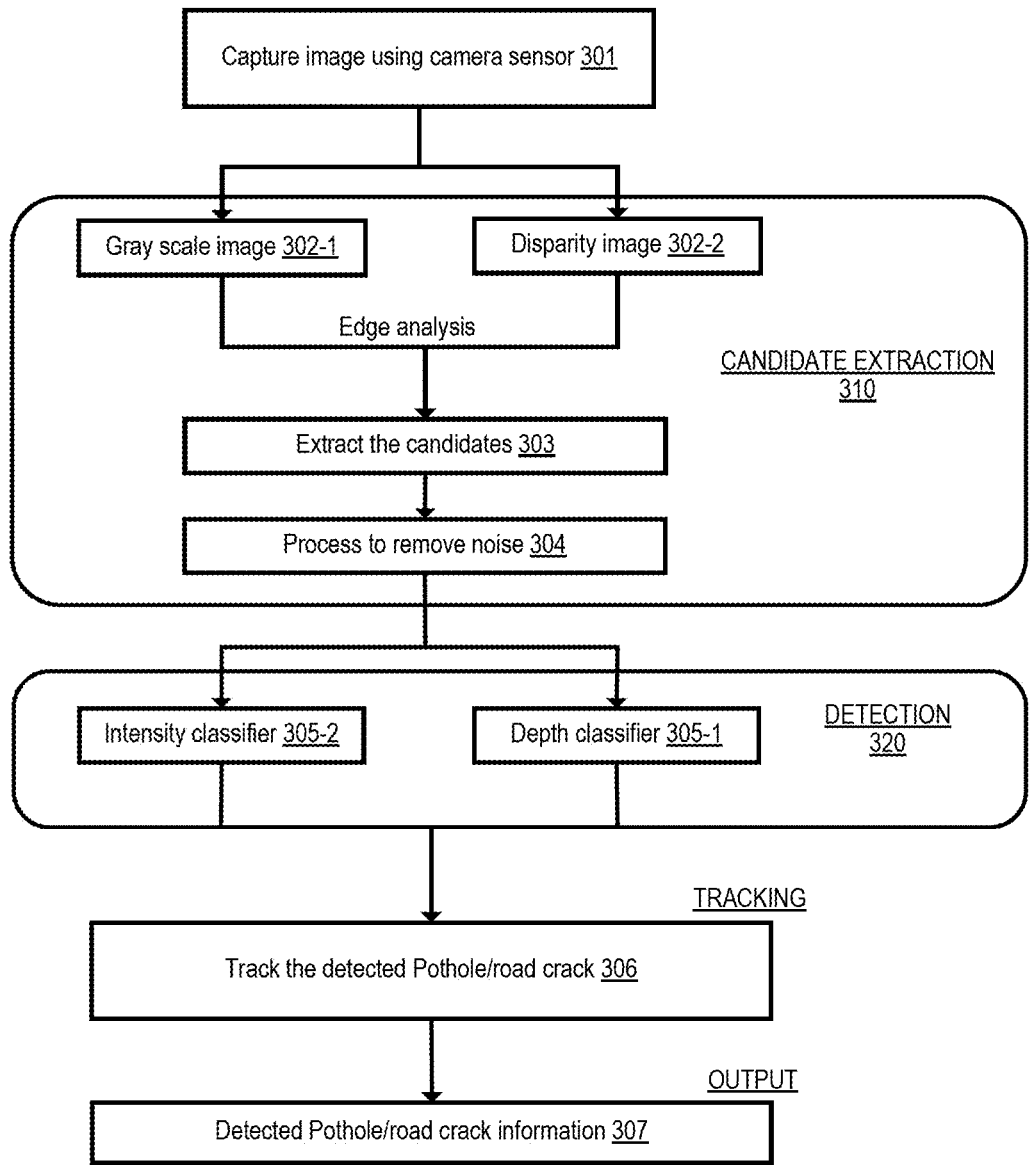
FIG. 3 illustrates an example flow diagram of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a camera system (e.g., mono camera or multiple cameras) which are mounted in the vehicle. The camera field of view is wide enough to capture the front road as shown in FIG. 1 and FIGS. 2(a) and 2(b). The camera system captures the images continuously. From using mono camera images/or images taken from multiple cameras, a depth map is generated.

FIG. 1 illustrates an example image from a camera system from a mono camera in accordance with an example implementation. FIGS. 2(a) and 2(b) illustrate example images from a stereo or multiple camera system whereas FIG. 2(a) is the left camera image and FIG. 2(b) is the right camera image in accordance with an example implementation. In the mono camera situation, the depth map can be calculated using a supervised learning approach, in which a training set of monocular and their corresponding ground-truth depth maps are captured. Then, by using a supervised learning method, the approximate value of the depth map can be predicted as a function of the image.

In the stereo or multiple camera situations, images are taken by multiple cameras which are used to calculate the depth map by using block matching techniques. In example implementations described herein, the descriptions are based on a stereo camera system, but other camera systems can be utilized in accordance with the desired implementation.

In a stereo camera system, there are two cameras, the right camera and the left camera which observe the same scene. Thus two images are obtained from two different angles of view. Once the two stereo images are captured, the images are processed by pothole detection system.

FIG. 3 illustrates an example flow diagram of the system, in accordance with an example implementation. At first, the camera system captures images at 301. Then, disparity images 302-2 and greyscale images 302-1 are calculated from the images taken from mono-camera or multiple cameras. Then the region of interest (ROI) is detected, which is a road surface which may contains depressions such as potholes, road cracks and/or obstacles such as vehicles or traffic poles, and so on. From the ROI, the roadway depression candidates such as potholes are extracted at 303 and noise is filtered at 304. In the detection phase 320, using depth classifier 305-1 and intensity classifiers 305-2, depressions are detected from extracted candidates. Finally, the tracking system is used to predict the depression location 306, and the depression locations are output at 307. The algorithms and processes used in each step are explained as follows.

Candidate extraction 310 involves two aspects, ROI detection, and extraction of depression candidates. For detecting ROI, stereo images, disparity images (depth map), edge image and detected lane marker information is utilized.

Figure 4:
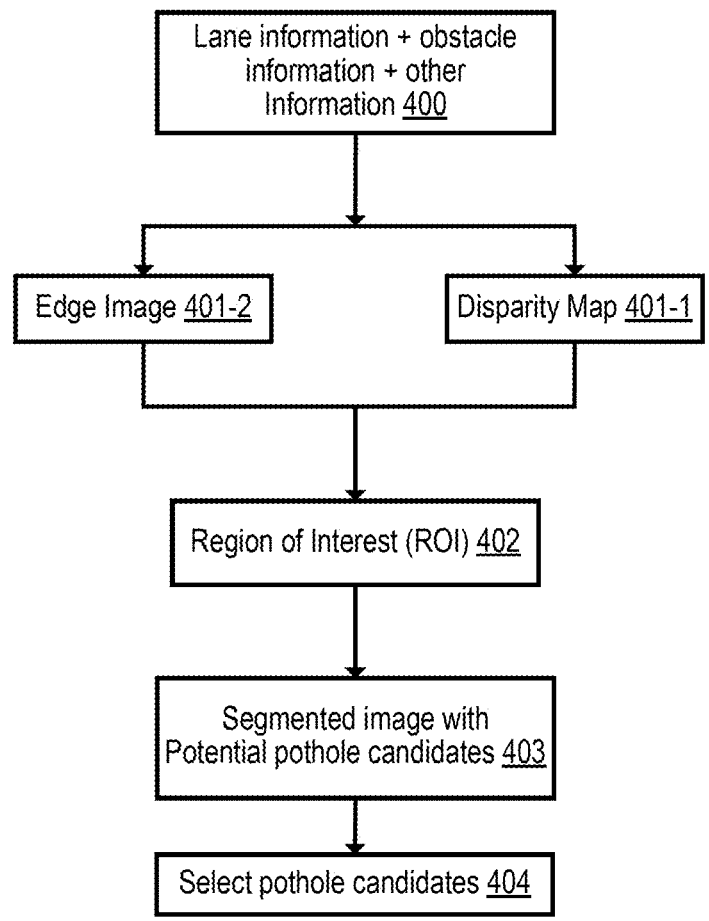
FIG. 4 illustrates an overview of the candidate extraction method, in accordance with an example implementation.

FIG. 4 illustrates an overview of the candidate extraction method 310, in accordance with an example implementation. At 400, information such as lane information, obstacle information, and other information may be provided into the system, either through the cloud or other methods in accordance with the desired implementation.

Calculating disparity image 401-1.

In vehicle systems having a single camera, the disparity image 401-1 is generated by using a machine learning process received from a cloud system. The machine learning process is trained to generate disparity images based on a received image of the roadway against what is expected of a roadway. Such a machine learning process can be constructed using any method known in the art according to the desired implementation.

Figure 5:
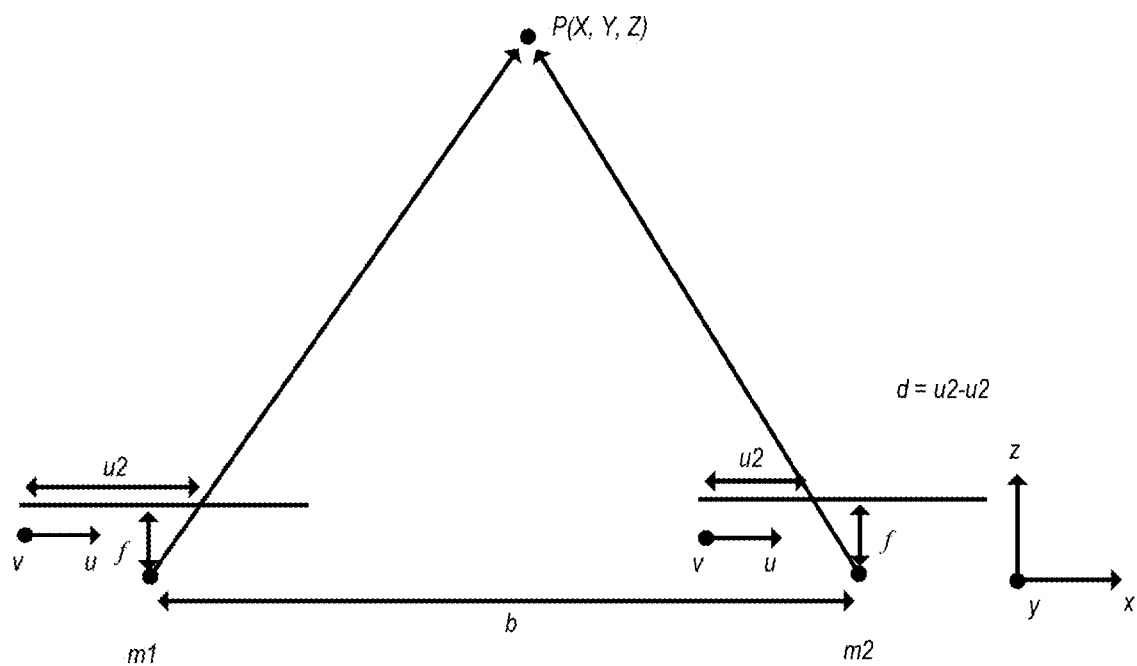
FIG. 5 illustrates a schematic diagram that shows a stereo camera by placing two cameras at a distance b.

In vehicle systems having multiple cameras, the disparity image 401-1 is calculated using two stereo images: left-image and right-image as shown in FIG. 2 by using a blocking matching method. Consider, for a point m1=(u1, v1) in one image, the corresponding point m2=(u2, v2) in the other image is in the same height as m1, i.e.: v1=v2. Disparity measurement technique can be explained using a simple stereo camera theory as shown in FIG. 5. FIG. 5 illustrates a schematic diagram that shows a stereo camera by placing two cameras at a distance b. In this context, the disparity is defined as:

$$D=u2-u1$$

The depth information of a 3D point can be obtained from the disparity since its depth is inversely proportional to the corresponding disparity. Disparity Map 401-1 is calculated by using Left & Right image and actual disparity.

$$Z=fb/d$$

Where,
Z=distance (depth) along the camera Z axis
f=focal length (in pixels)
b=baseline (in meters)
d=disparity (in pixels)

In order to remove unreliable disparity from disparity map, edge information 401-2 is utilized, which is defined as pixel which gray level differs from the gray level of adjacent pixel. In a disparity map, reliability of each disparity is calculated to discard unrealizable disparity. Resultant modified disparity map is as shown in FIG. 6, which is known as threshold disparity image, and edge image which is used to get threshold image is as shown in FIG. 6.

By controlling the threshold value of edge image, the amount of disparity that needs to be removed from disparity map can be determined, which is used for segmenting potential pothole candidates.

ROI detection/Extraction 402

Figure 7:
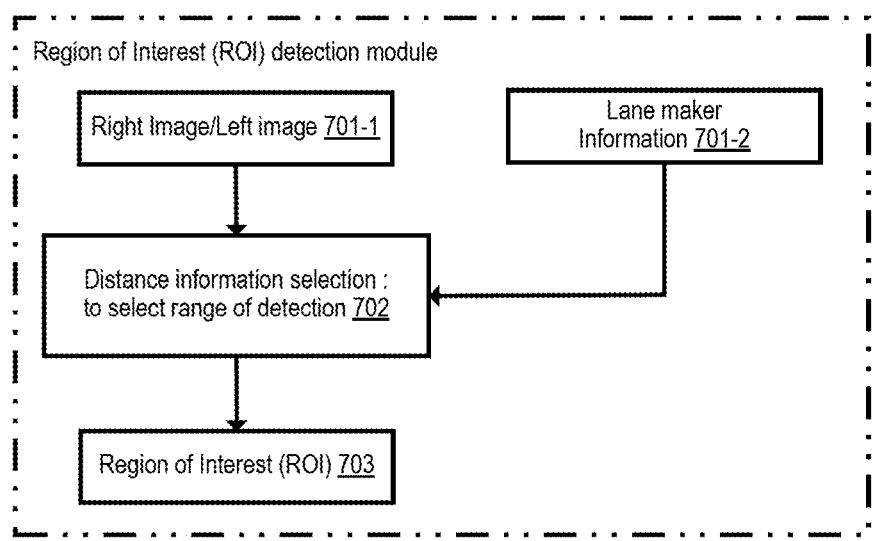
FIG. 7 illustrates a flow diagram for ROI detection, in accordance with an example implementation.

FIG. 7 illustrates a flow diagram for ROI detection, in accordance with an example implementation. Using the right/left image 701-1 and the output of the lane marker detection algorithm 701-2, pixel positions (row, column) of left and right lane markers (at every 4 m distance from camera) on image is calculated. Using this lane information, the ROI boundaries (both left and right side) are calculated at every row for entire image. At 702, depending upon the range of detection, the upper and lower boundaries can be selected to form the ROI at 703 to extract the pothole candidates.

Figure 8A:
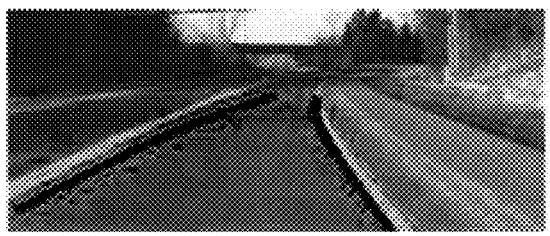
FIG. 8(a) illustrates the detected lane markers in dark black lines.
Figure 8B:
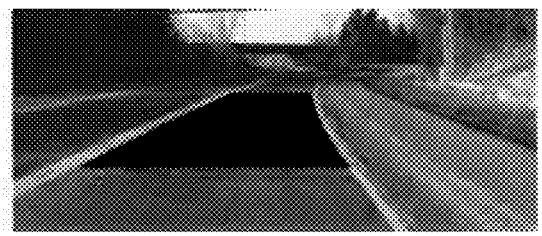
FIG. 8(b) illustrates the detected ROI as a dark black area, in accordance with an example implementation.

In example implementations, the disparity image is analyzed at different threshold and found out that at threshold=5, shows presence of potholes compared to other threshold. From FIG. 6, the disparity at threshold=5 has more noise level compared to threshold=8, however, the noise level is less from 10 meters (m) to Z meters (Z is the highest detection range) on both cases. The sample detected lane marker and ROI is as shown in the FIGS. 8(a) and 8(b). Specifically, FIG. 8(a) illustrates the detected lane markers in dark black lines, and FIG. 8(b) illustrates the detected ROI as a dark black area. The ROI is not only limited to ego vehicle's lane but also can be extended to right and left adjacent lane as well.

Extracting candidates in the detected ROI based on segmentation 403.

Once the ROI is detected, the segmentation module— texture is used to segment the foreground pixels from background pixels. In order to reduce the number of non-depression candidates passed to the next process and thereby reducing the processing time, the edge image is used during segmentation.

Figure 9:
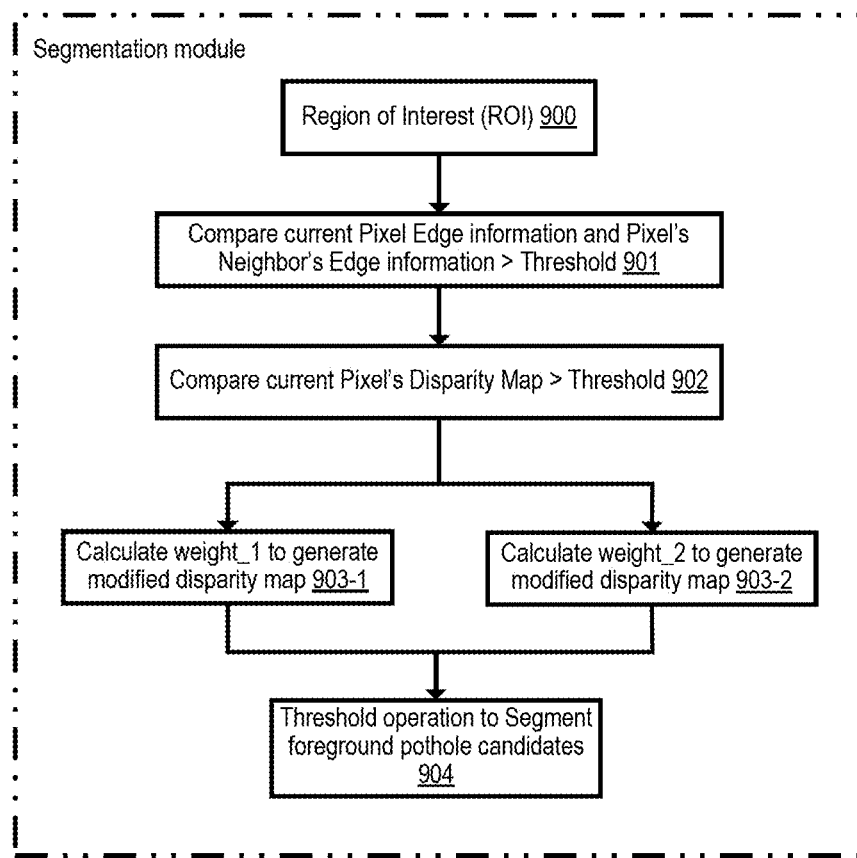
FIG. 9 illustrates a segmentation algorithm flowchart, wherein edge image pixels are compared with corresponding threshold disparity map and weights are calculated in accordance with an example implementation.

FIG. 9 illustrates a segmentation algorithm flowchart, wherein edge image pixels are compared with corresponding threshold disparity map and weights are calculated in accordance with an example implementation. Based on these weights, the current pixel will be classified as foreground or background pixels. Similarly, by using threshold operations, the foreground is segmented from intensity or gray scale image.

Figure 10A:
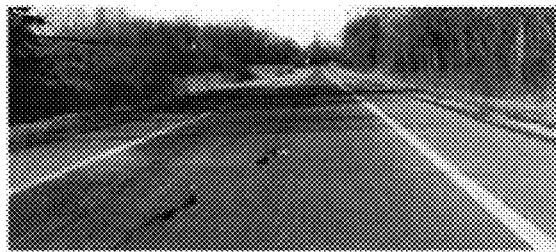
FIG. 10(a) illustrates the right/left image.
Figure 10B:
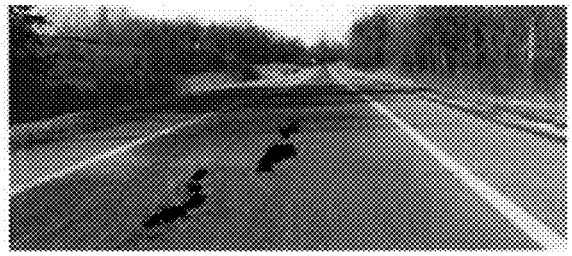
FIG. 10(b) illustrates the candidate extraction output.

At 900, the Region of Interest (ROI) is obtained for segmentation by the segmentation module. At 901, the segmentation module compares the current Pixel Edge information and Edge information of the neighboring pixels that meet a threshold. At 902, the segmentation module compares the disparity map of the current pixel to a threshold. At 903-1, the segmentation module calculates weight_1 to generate a modified disparity map and calculates weight_2 to generate a modified disparity map at 903-2. At 904, a threshold operation is conducted to segment the foreground pothole candidates. Once pothole candidates are segmented, it is processed to remove further noisy candidates and extracted final candidates as shown in FIGS. 10(a) and 10(b). Specifically, FIG. 10(a) illustrates the right/left image, and FIG. 10(b) illustrates the candidate extraction output.

Detection 320 involving intensity classifier 305-2 and depth classifier 305-1.

Figure 11:
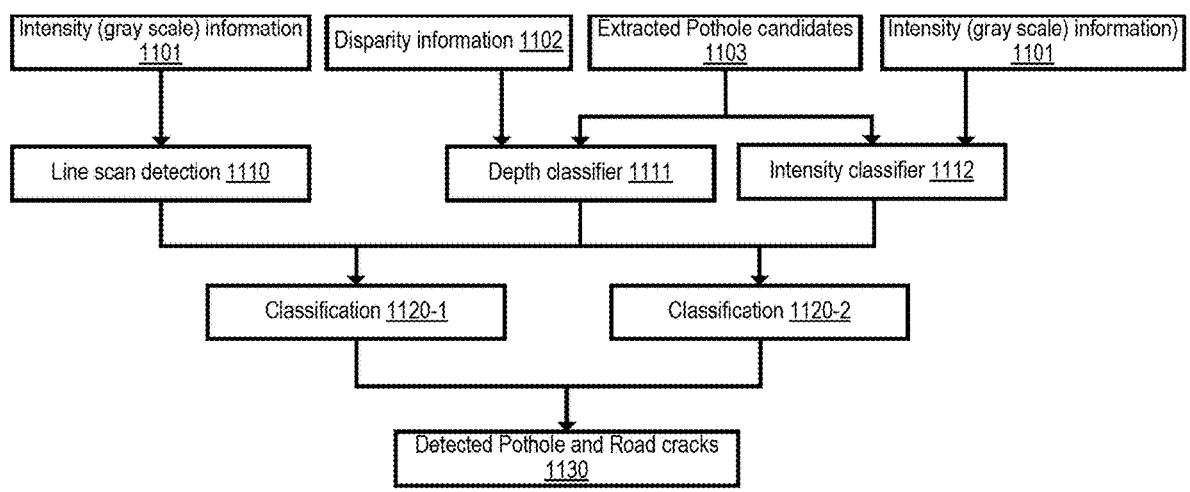
FIG. 11 illustrates an example flow for the classifier, in accordance with an example implementation.

FIG. 11 illustrates an example flow for the classifier, in accordance with an example implementation. Once candidates are extracted using candidate extraction method, each of the candidates will be passed through depth and intensity classifier (here both classifier works in-parallel) and based on both output extracted candidates will be classified as either pothole or non-potholes. In example implementations, depth 1111 and intensity 1112 based classifiers are utilized to detect pothole candidates from extracted candidates at 1130. In addition to the two classifiers, a line scan method 1110 is utilized to detect the horizontal road crack and also to remove the shadows during classification 1120-1, 1120-2. To conduct the classifiers, the line scan detection 1110 is provided an intensity information 1101 (e.g., grayscale image) of the camera images. The depth classifier 1111 is provided disparity information 1102 as described with respect to FIGS. 6 and 9, as well as the extracted pothole candidates 1103 as described with respect to FIG. 3. The intensity classifier 1112 receives intensity information 1101 and the extracted pothole candidates 1103.

Intensity Classifier 305-2—Dividing Candidate Regions

Figure 12:
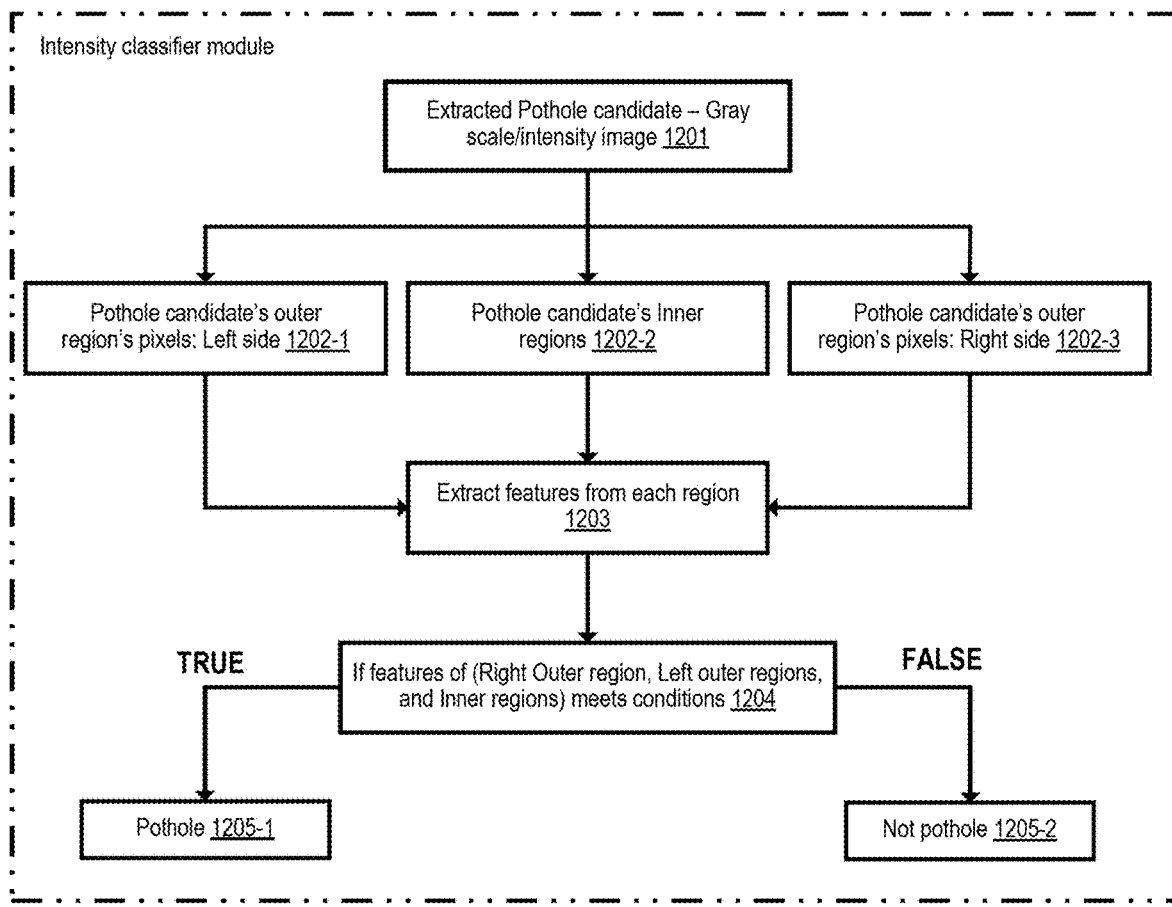
FIG. 12 illustrates a flowchart of the intensity classifier, in accordance with an example implementation.
Figure 13:
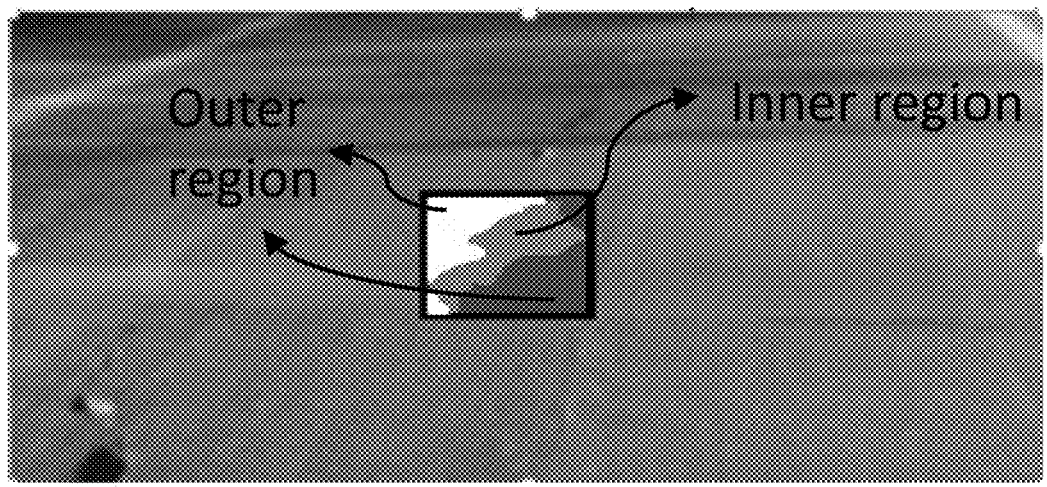
FIG. 13 illustrates an example sample image with extracted candidate divided into different regions, in accordance with an example implementation.

In the intensity classifier 1112, the classification is done based on the various intensity (gray scale image) features which are extracted from candidates. FIG. 12 illustrates a flowchart of the intensity classifier, in accordance with an example implementation. Extracted candidates based on the gray scale or intensity images 1201 are divided into inner 1202-2 and outer regions, where outer regions can be further divided into regions such as left side 1202-1, right side 1202-3, as well as upper and lower regions in accordance with the desired implementation. FIG. 13 illustrates an example sample image with extracted candidate divided into different regions, in accordance with an example implementation.

FIG. 14 illustrates an example of dividing extracted candidates based on different cases, in accordance with an example implementation. While dividing extracted candidates into different regions, two cases will be considered as shown in FIG. 14.

Case 1: All four outer regions around the pothole (both right and left regions) contain almost the same number of pixels. So, the effect from noise is low when features are extracted from each region.

Case 2: Left side outer regions (both up and down region) contains fewer pixels than the right side outer region. Hence, even small amounts of noise in the left side regions can affect the classifier output (i.e. presence of noise can affect extracted features, which may leads to false detection).

If the candidate falls into case 2, the bounding box around the pothole region (i.e. neighbor region) is extended by at least two pixels (both row and column-wise). Here, the neighbor region extension size (row and column wise) depends on the inner region size of the candidate, as well as the candidate's distance from the ego vehicle.

Thus as shown in FIG. 12, the features are extracted from each of the regions at 1203, and then a determination is made as to whether the features of the regions meet the specified conditions as illustrated in FIGS. 13 and 14 at 1204. From the determination, the candidates are classified as either a pothole 1205-1, or not a pothole 1205-2.

Figure 15A:
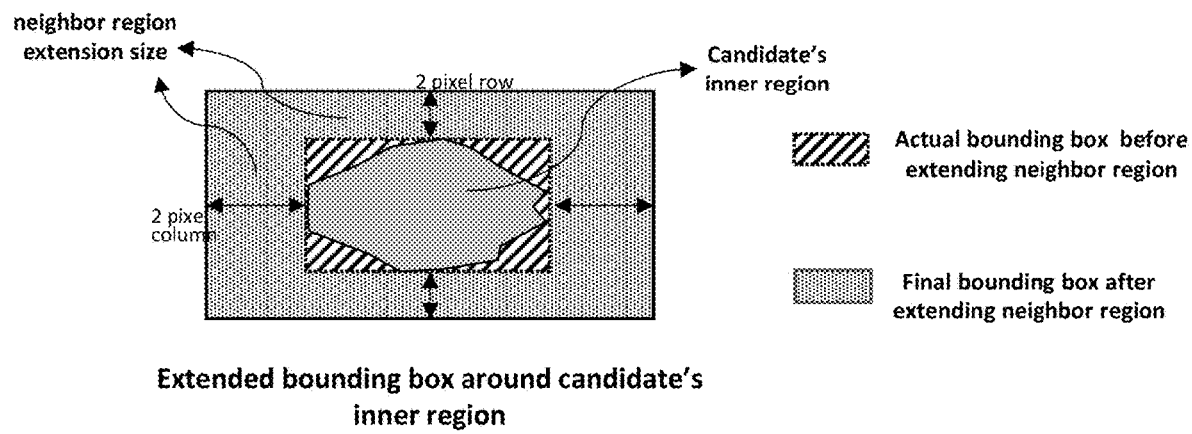
FIGS. 15(a) and 15(b) illustrate examples of the output of a divided candidate region in accordance with an example implementation.
Figure 15B:
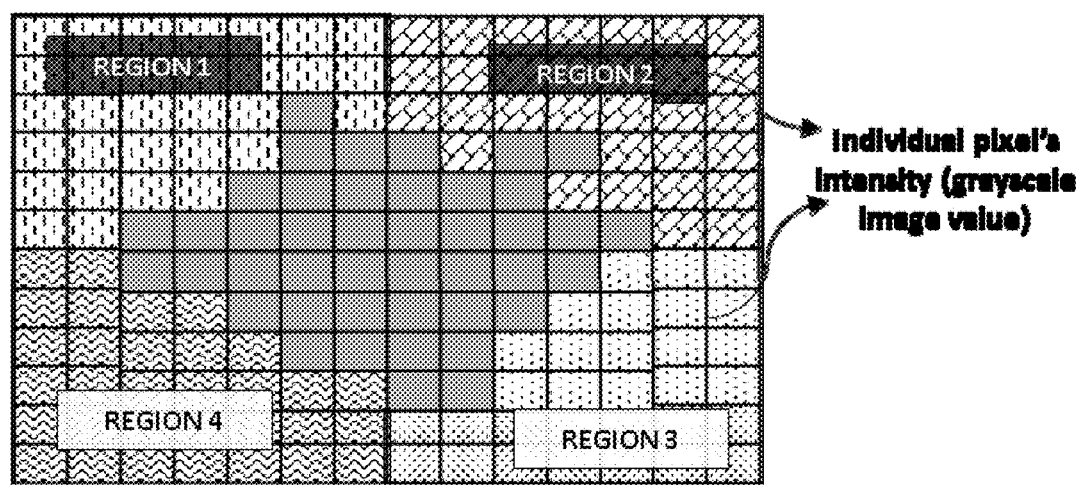

The methods shown in FIGS. 13 and 14 are used in order to reduce effects of noise present in the image there by reducing false detection. FIGS. 15(*a*) and 15(*b*) illustrate examples of the output of a divided candidate region (after extending) considering the two cases mentioned above.

Intensity Classifier 305-2—Statistical Analysis and Classification

Once the bounding box around candidate is extended (using distance and size of the candidate) as illustrated in FIG. 15(*a*), features are extracted from each regions for statistical analysis as illustrated in FIG. 15(*b*). To conduct the statistical analysis and classification, the outer regions are divided into sub-regions (e.g. at least two) as illustrated in FIG. 15(*b*). Then, the distribution of intensity is analyzed at each of the regions separately and such distributions are compared with other regions and finally with the inner regions. Subsequently, each of these features are compared with a specific threshold (e.g., calculated using previously analyzed data by statistical analysis). Based on the specified threshold conditions, intensity classifier results will be used along with depth classifier results.

Depth Classifier 305-1—Extraction of Valid Pixels

Figure 16:
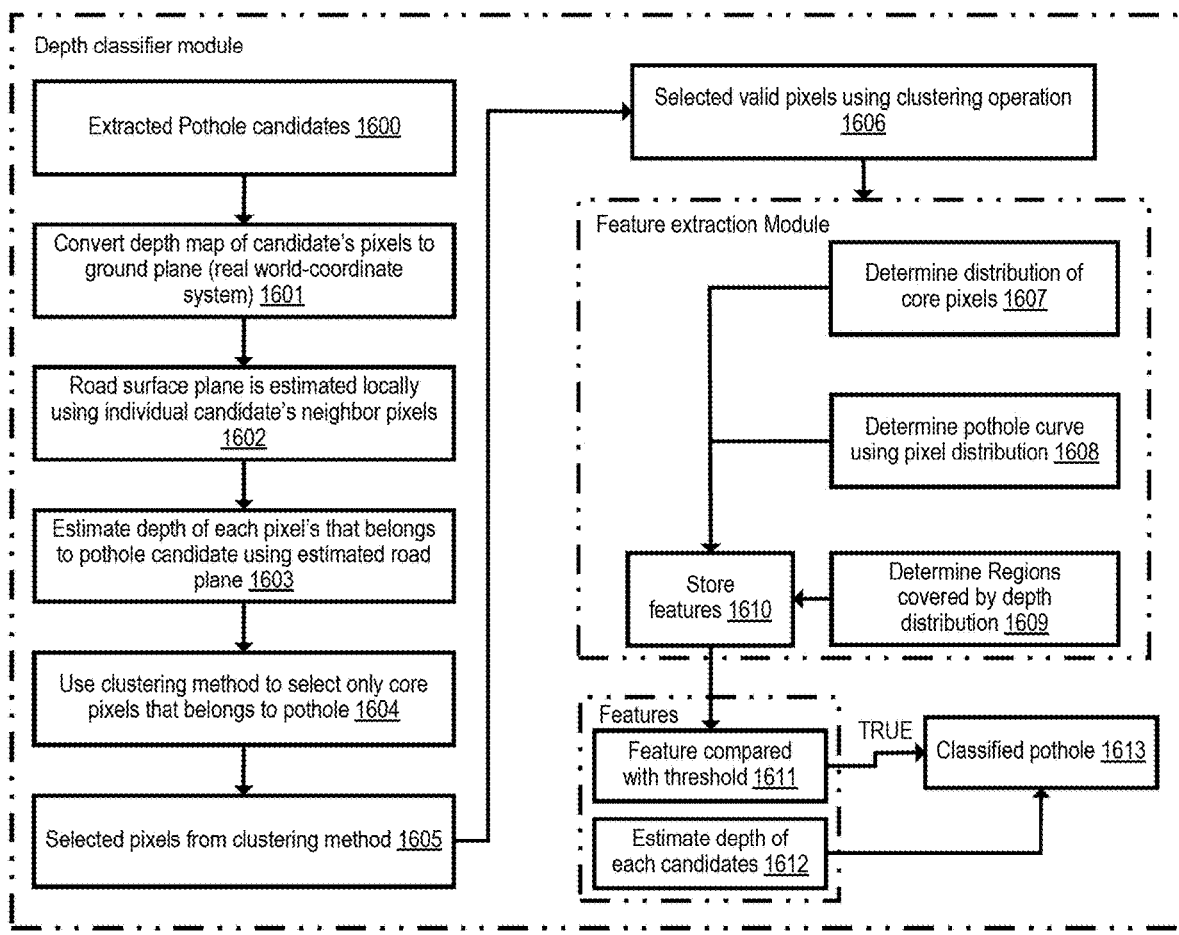
FIG. 16 illustrates an example flowchart of the depth classifier, in accordance with an example implementation.

1. For the depth classifier, classification is done using features which are extracted from data or disparity information from each candidates (candidate extraction output). FIG. 16 illustrates an example flowchart of the depth classifier, in accordance with an example implementation.

At first, the extracted pothole candidates 1600 are provided, and the depth maps of the candidate pixels are converted to the ground plane (e.g., as a real world-coordinate system) at 1601. At 1602, the road surface plane is estimated locally using the neighboring pixels of the individual candidates. The road plane/surface estimation is conducted using disparity information. Instead of calculating the entire road plane, only the extracted candidate regions and the neighboring regions are used for road plane estimation to increase the processing speed and to reduce memory requirements. The road surface (road plane) estimation is done using pixels around the candidate's inner region and involve a process as follows. At first, for each neighboring pixel (pixels around candidate's inner region), disparity values are verified. If the calculated disparity values are correct (e.g., verified using previously calculated thresholds), then they are designated as 'valid pixels', otherwise they are designated as 'invalid pixels' indicating that they are noisy pixels. If there are an insufficient number of valid pixels around the candidate's inner region, the road surface estimation can be inaccurate which leads to false depth measurement (e.g., of the candidate's inner region depth) and false detection.

Figure 17:
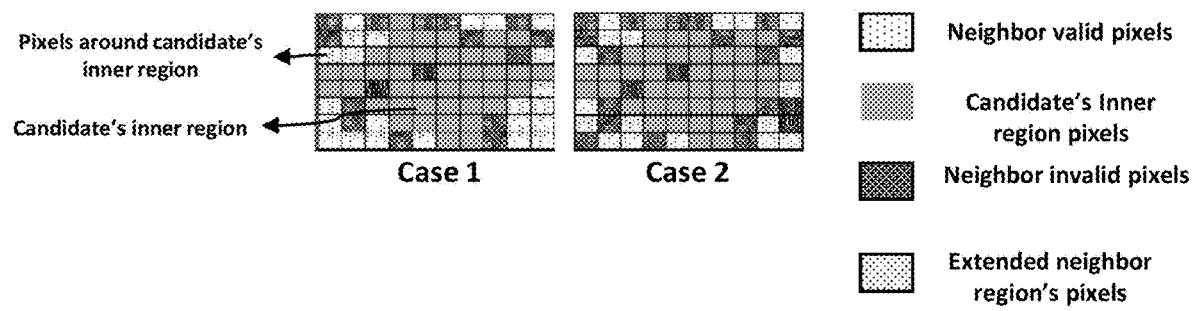
FIG. 17 illustrates examples of extracted candidate regions, in accordance with an example implementation, specifically with two cases involving valid and invalid pixels.

FIG. 17 illustrates examples of extracted candidate regions, in accordance with an example implementation, specifically with two cases involving valid and invalid pixels.

Case 1: Candidate's outer region contains more than the threshold number of valid pixels around inner candidate's region (e.g., 20), in which the presence of noise has low effect on the road surface estimation.

Case 2: Candidate's outer region contains less than the threshold of valid pixels, hence leading to an inaccurate road surface estimation.

Figure 18:
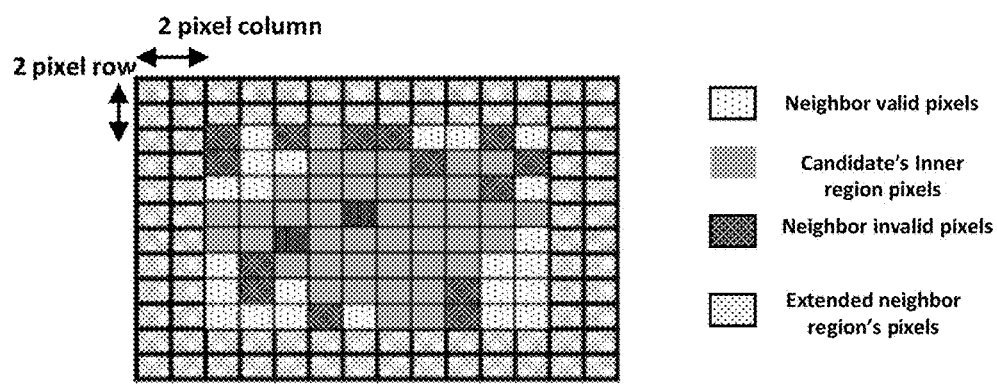
FIG. 18 illustrates an example of the output of extracted candidate region after extending bounding box around candidate's inner region, in accordance with an example implementation.

If the number of valid pixels are less than the threshold, the bounding box can be increased (e.g., by two pixels row-wise and two pixels column-wise) as shown in FIG. 18. FIG. 18 illustrates an example of a detection of a lane marker (e.g., the neighboring invalid pixels) image along with the region of interest (area bounded by the extended neighbor region pixels). As shown in FIG. 18, the size of the pixel extension depends on the size and distance of the candidate.

Depth Classifier 305-2—Co-ordinate Transformation

Once valid pixels are extracted, the road plane can be estimated at 1602 using pixels around the inner candidate region (neighbor valid pixels and extended neighbor region pixels) as shown in FIG. 18.

Figure 19:
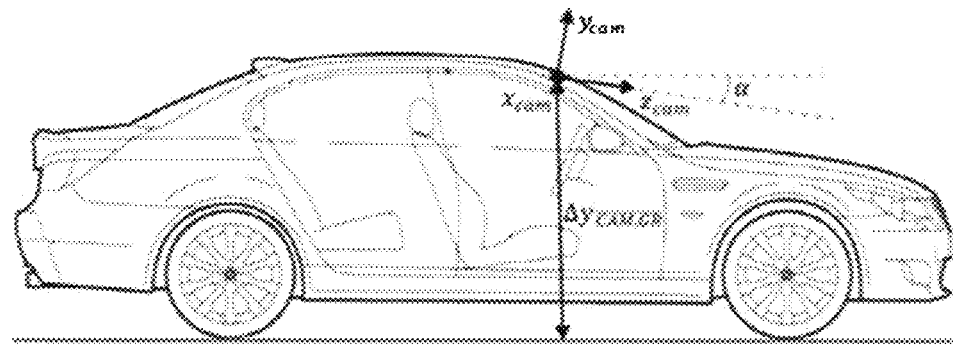
FIG. 19 illustrates a camera co-ordinate system, in accordance with an example implementation.

In example implementations, the camera has a defined position on the car chassis as shown in FIG. 19. The position includes an angle α between the z-axis of the camera and a flat road plane and a displacement from the center of the car. To now calculate the 3D data related to the camera coordinate system, the calibration matrix C can be used. The equations below describe the transformation between the UVD space to the $XYZ_{cam}$ space $$\begin{pmatrix} x' \\ y' \\ z' \\ w \end{pmatrix} = \begin{pmatrix} 1 & 0 & 0 & u_c \\ 0 & 1 & 0 & v_c \\ 0 & 0 & 0 & \frac{f}{\delta} \\ 0 & 0 & \frac{1}{b} & 0 \end{pmatrix} * \begin{pmatrix} u \\ v \\ d \\ 1 \end{pmatrix}$$

$$x_{cam} = \frac{x'}{w}, \ y_{cam} = -\frac{y'}{w}, \ z_{cam} = \frac{z'}{w}$$

Regarding the calibration matrix, $u_c$ and $v_c$ describe the center of the image. In case of the used camera system some adjustments have to be made regarding the theoretical equations. The v axis of the image coordinate system doesn't point in the same direction. Accordingly the sign of $y_{cam}$ value is changed.

As noted above, the calibration matrix C can be used to transform a data point from the UVD space into the $XYC_{cam}$ space. In the following, the equations to transform a data point in the $XYC_{cam}$ space back into the UVD space ae described. Using the calibration matrix C the following single equations can be formed:

$$x' = u + u_c, \ y' = v = v_c, \ z' = \frac{f}{\delta}, \ w = \frac{d}{b}$$

$$x_{cam} = \frac{x'}{w}, \ y_{cam} = -\frac{y'}{w}, \ z_{cam} = \frac{z'}{w}$$

From using the equations above to get two resulting formulas for u and v, the result is given as follows:

$$u = \frac{f * x_{cam}}{\delta * z_{cam}} - u_c$$

$$v = -\frac{f * y_{cam}}{\delta * z_{cam}} - v_c$$

Figure 20A:
FIGS. 20(a) and 20(b) illustrate an example implementation of determining transformed data points with respect to the camera coordinate system of a vehicle given a left/right image.
Figure 20B:
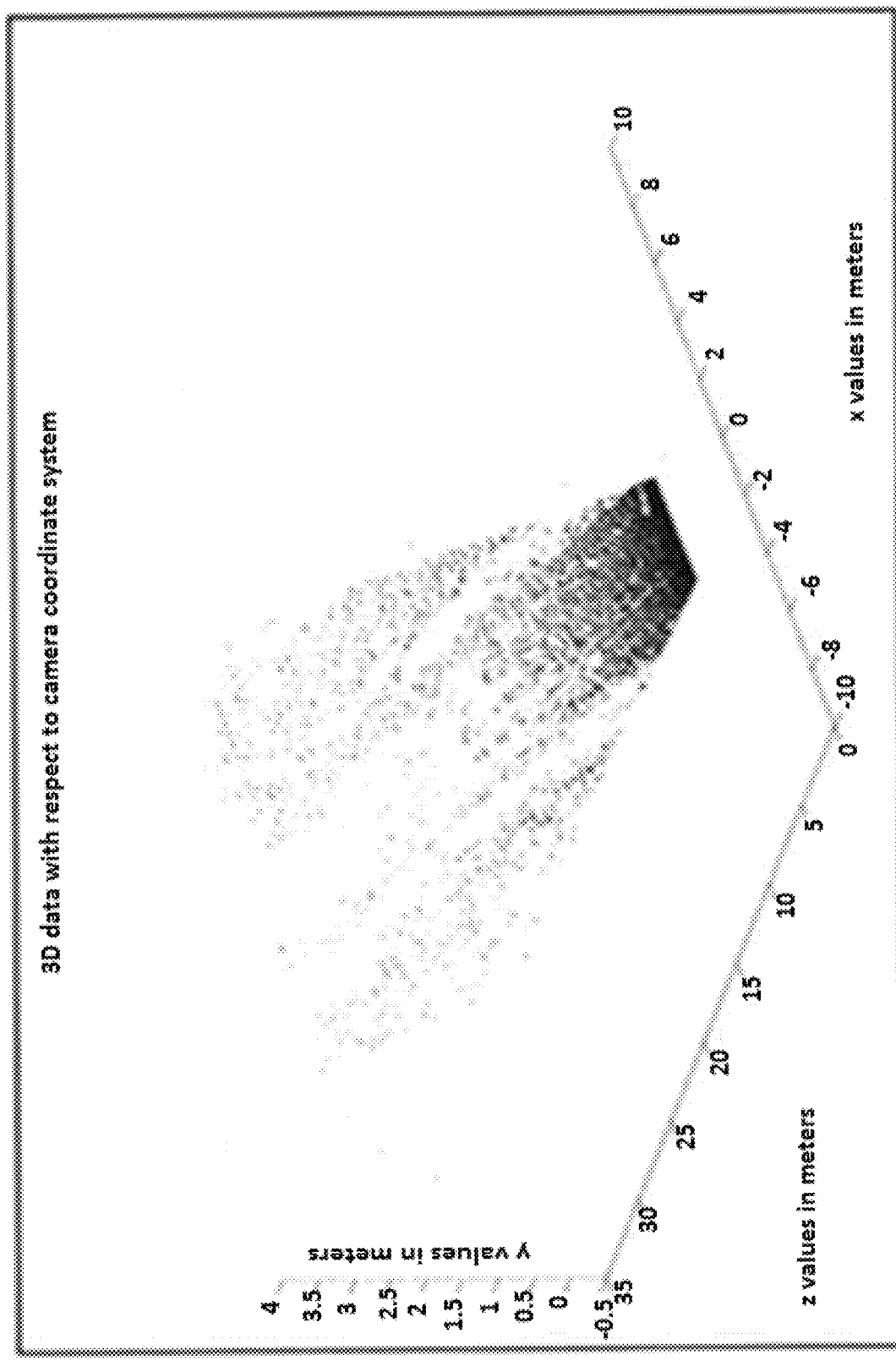

With the resulting formulas, any data point in the $XYZ_{cam}$ space can be transformed into the UVD space, except data points with $z_{cam}=0$, which is in general indicates that there is no practical restriction. As illustrated in FIGS. 20(a) and 20(b), from the right/left image of FIG. 20(a), the transformed data points can be represented with 3D data points with respect to the camera coordinate system as illustrated in FIG. 20(b).

Depth classifier 305-2—Road Plane Estimation 1602

A least squares algorithm or similar algorithm can be used to estimate the road plane. To set up the least squares algorithm the function model of the road plane has to be defined:

$$y_{gr} = a_1 \cdot x_{gr} + a_2 \cdot z_{gr} + a_3$$

The road plane model involves three parameters. To keep the model complexity low, only a linear model has been considered. Using this function model no curvature information can be extracted. As long as the area in which the road plane should be extracted is small enough this model is accurate enough. The measurement model of the algorithm is given as follows:

$$\begin{pmatrix} y_1 \\ \vdots \\ y_n \end{pmatrix} = \begin{pmatrix} x_{gr,1} & z_{gr,1} & 1 \\ \vdots & \vdots & \vdots \\ x_{gr,n} & z_{gr,n} & 1 \end{pmatrix} * \begin{pmatrix} a_1 \\ a_2 \\ a_3 \end{pmatrix}$$

Figure 21:
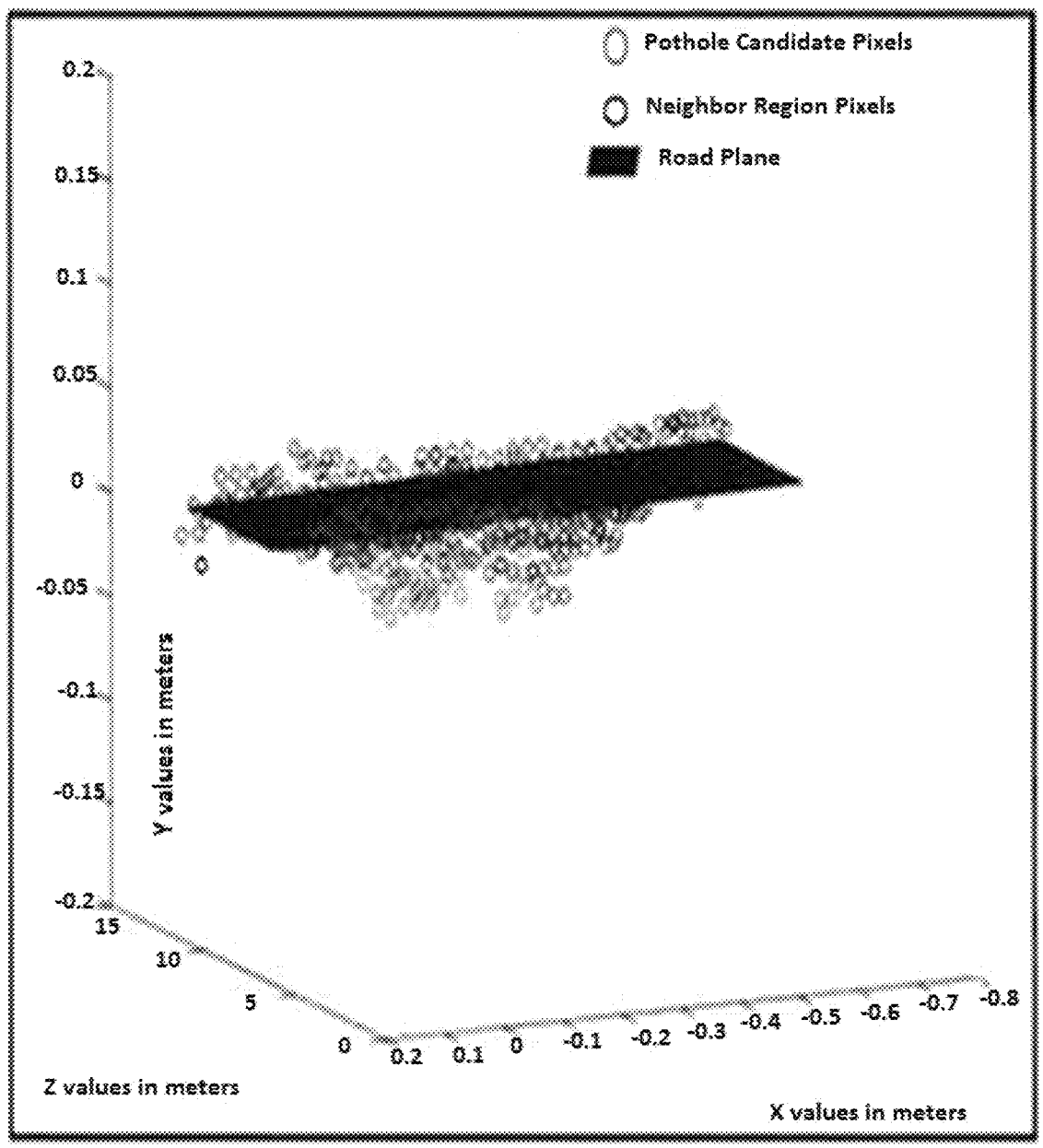
FIG. 21 illustrates an estimated road plane.
Figure 22:
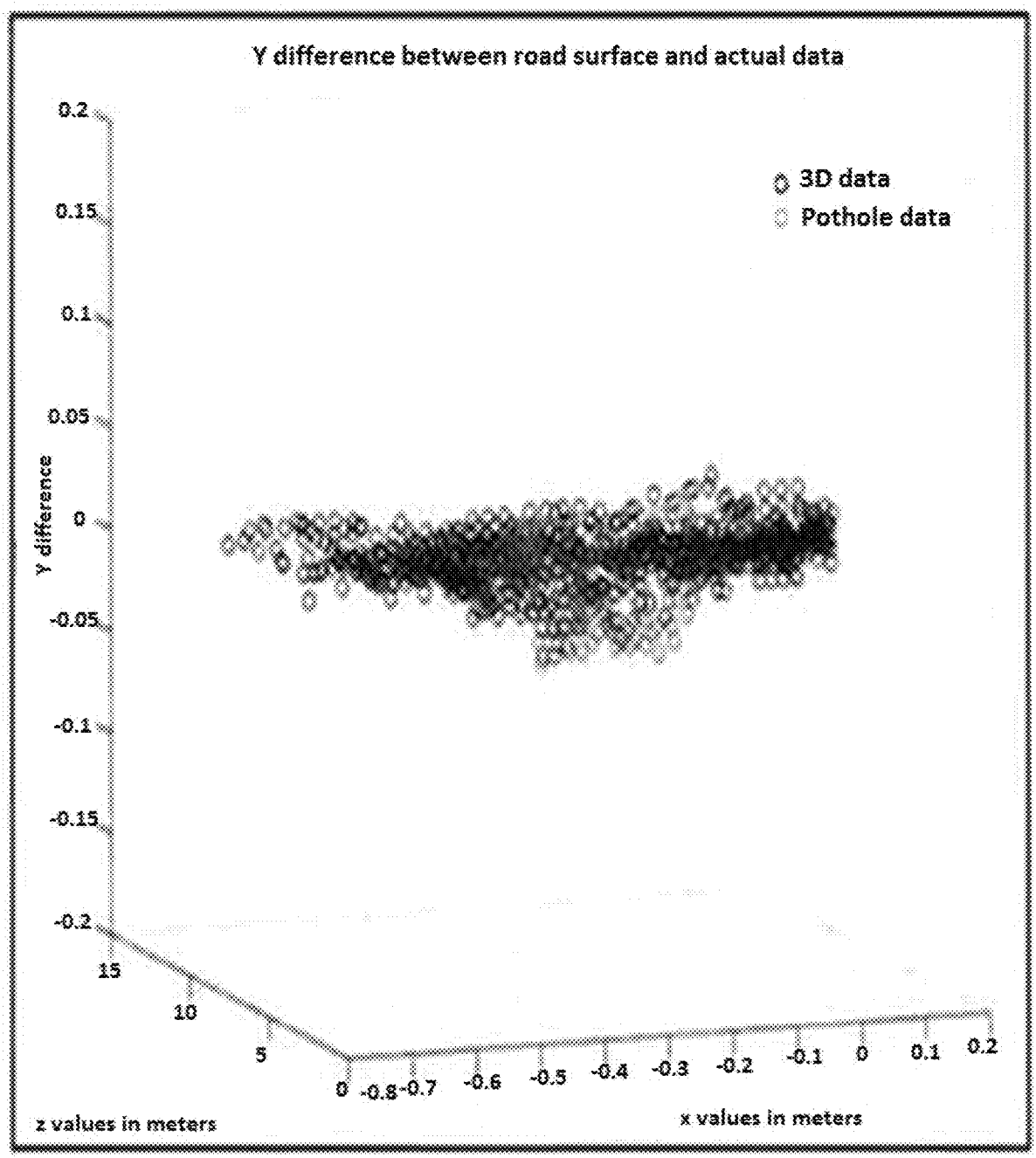
FIG. 22 illustrates the estimated depth data, in accordance with an example implementation.

To fill the measurement matrix with data, only no pothole points are considered, otherwise the depth information won't be accurate, because of the influence of the pothole point on the parameter calculation itself. To solve the measurement matrix equation and extract the road plane parameters are extracted. FIG. 21 illustrates an estimated road plane, and FIG. 22 illustrates the estimated depth data, in accordance with an example implementation.

Depth classifier 305-2—Depth Estimation 1603

At 1603, the depth of each pixel is estimated through utilizing the estimated road plane. Once the road plane is estimated using valid pixels around the candidate's inner region at 1602, by using the road plane height and the height of each of the pixels, the actual depth of each pixel can be calculated. The output is as shown in FIG. 22, and equation used for this is as follows:

$$\Delta y_{gr\_p} = y_{gr\_p} - a_1 \cdot x_{gr\_p} - a_2 \cdot z_{gr\_p} - a_3$$

Depth classifier 305-2—Clustering 1604

Figure 23:
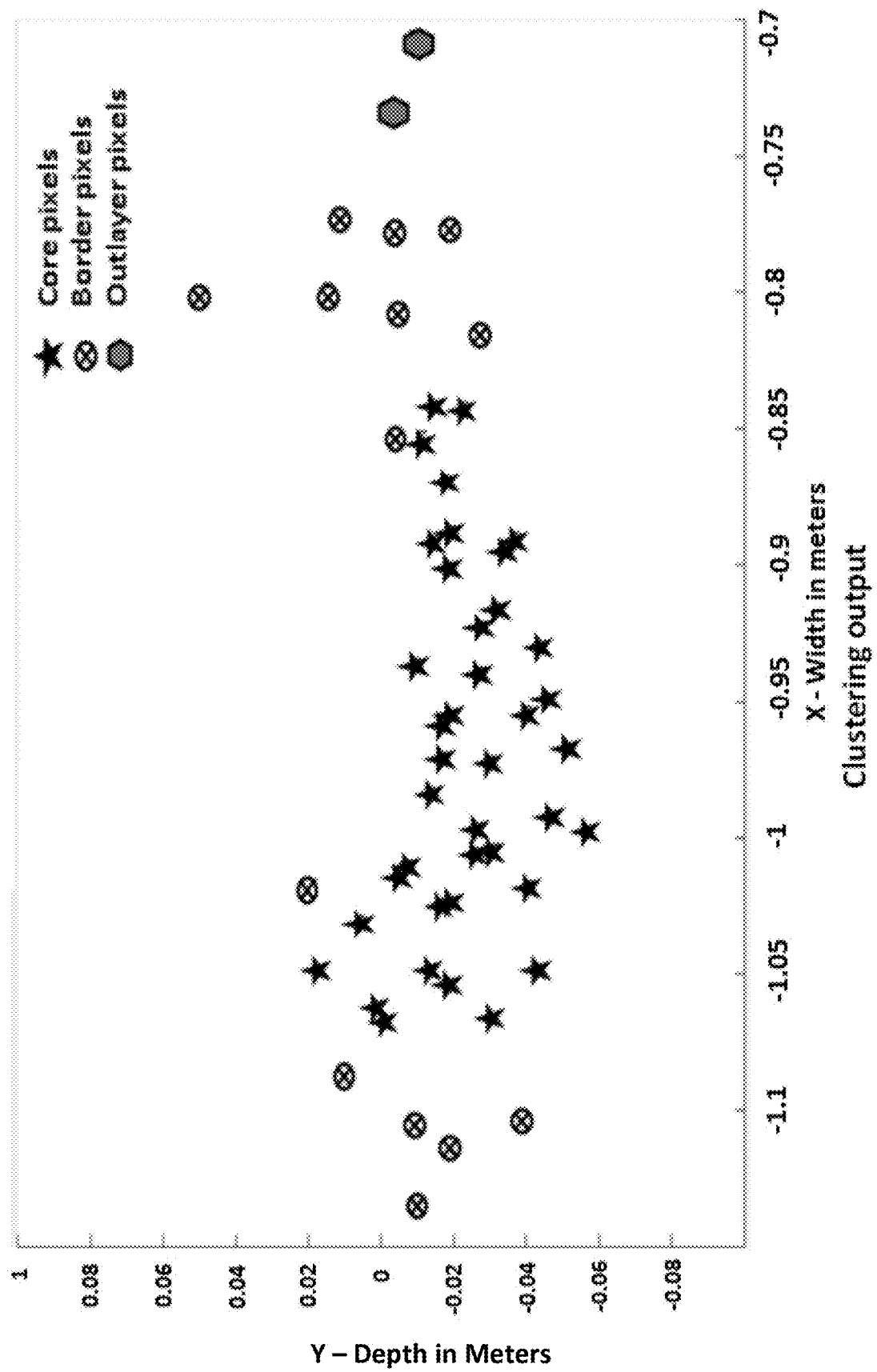
FIG. 23 illustrates an example output of the cluster algorithm, in accordance with an example implementation.

At 1604, a clustering method is utilized to select only the core pixels that belong to the pothole, wherein the selected pixels are used at 1605 to reduce the noise level in the estimated depth data. In example implementations, the clustering method is used to divide the data set into a core cluster indicative of actual depth information, and outliers indicative of inaccurate depth information. FIG. 23 illustrates an example output of the cluster algorithm, in accordance with an example implementation.

Depth classifier 305-2—Feature Extraction and Classification 1606-1613

Figure 24:
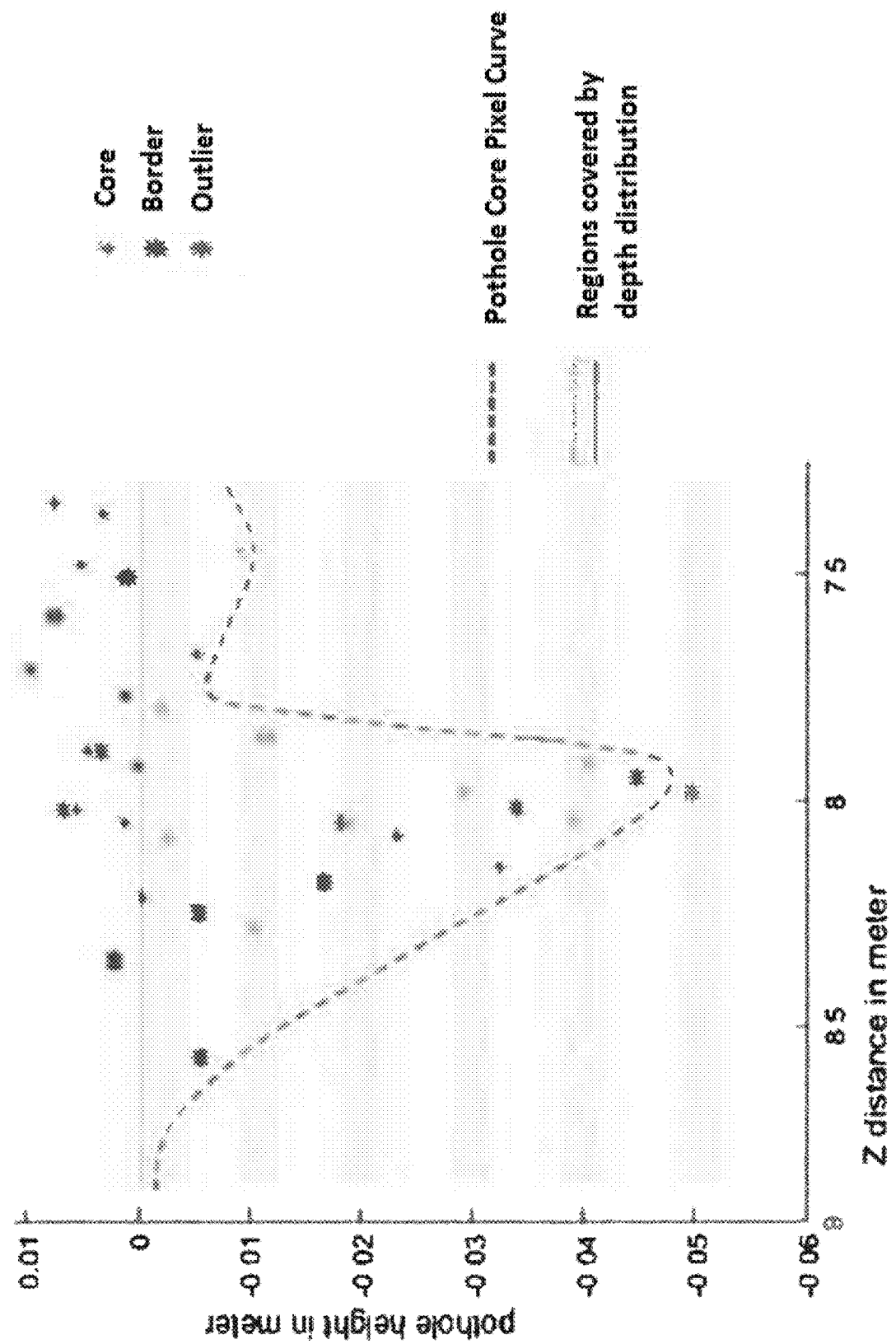
FIG. 24 illustrates a curve of core pixels distribution and regions covered by depth distribution, in accordance with an example implementation.

FIG. 24 illustrates a curve of core pixels distribution and regions covered by depth distribution, in accordance with an example implementation. In example implementations described herein, a feature extraction module is utilized to conduct feature extraction and classification. From the clustering operation, valid pixels are used for the feature extraction at 1606. That is, only the core pixels from the clustering output and its depth values are extracted for the estimation, as they belong to the actual pothole candidates. Once core pixels are extracted, the following features will be calculated by the feature extraction module: the distribution of the core pixels 1607 (e.g., the number of core pixels in each of the regions), the pothole curvature based on the distribution of the core pixels 1608, and the number of regions covered by depth distribution 1609. The features are stored in at 1610 for use.

Analysis of extracted features using only valid core pixels shows that the curve of core pixel's depth distribution resembles inverted Gaussian curve (similar to pothole shape) with slope 'M'. Also, the depth distribution of valid core pixels always covers more regions in case of potholes than in noise.

These features will be compared with specific threshold values (which are previously calculated) at 1611. If it meets threshold conditions, the depth classifier output will be compared with intensity classifier and will decide whether to classify it as pothole or not at 1613.

Depth Classifier 305-2—Estimate the Actual Depth of Pothole 1612

Figure 25:
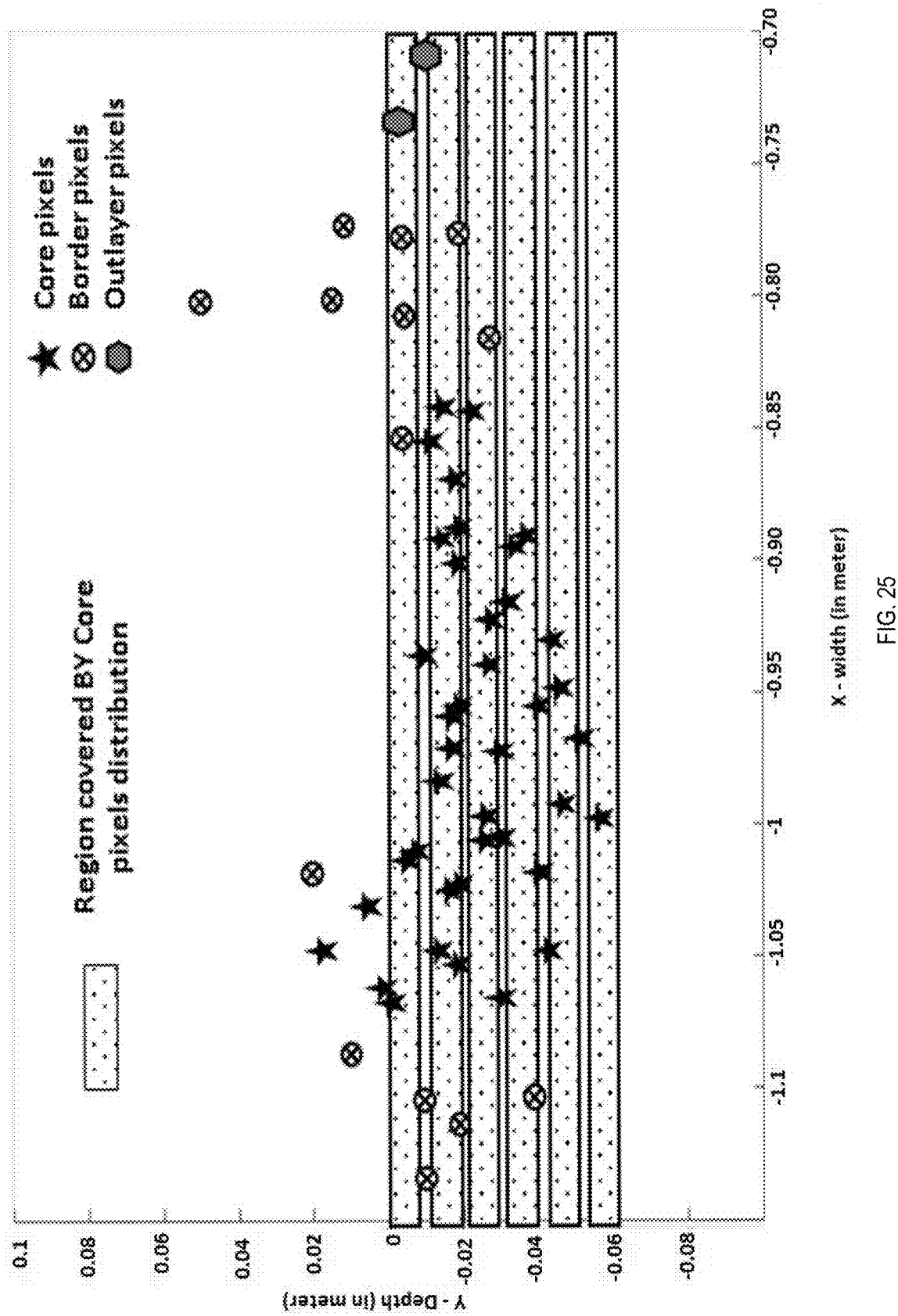
FIG. 25 illustrates an example estimation of the actual depth of detected candidates, in accordance with an example implementation.

Using the core pixel cluster, the actual depth of each of the detected potholes can be estimated at 1612. FIG. 25 illustrates an example estimation of the actual depth of detected candidates, in accordance with an example implementation. In the example of FIG. 25, the cluster region having the maximum number core pixels with the highest "negative" depth (e.g., within a specified threshold) is determined. Using depth values of each pixel and the 3D information of such pixels in the region, the actual maximum depth is estimated. FIG. 26 illustrates examples of detected potholes and road cracks using the proposed depth and intensity classifier.

Line Scan Module 1110—Candidate extraction

Figure 27:
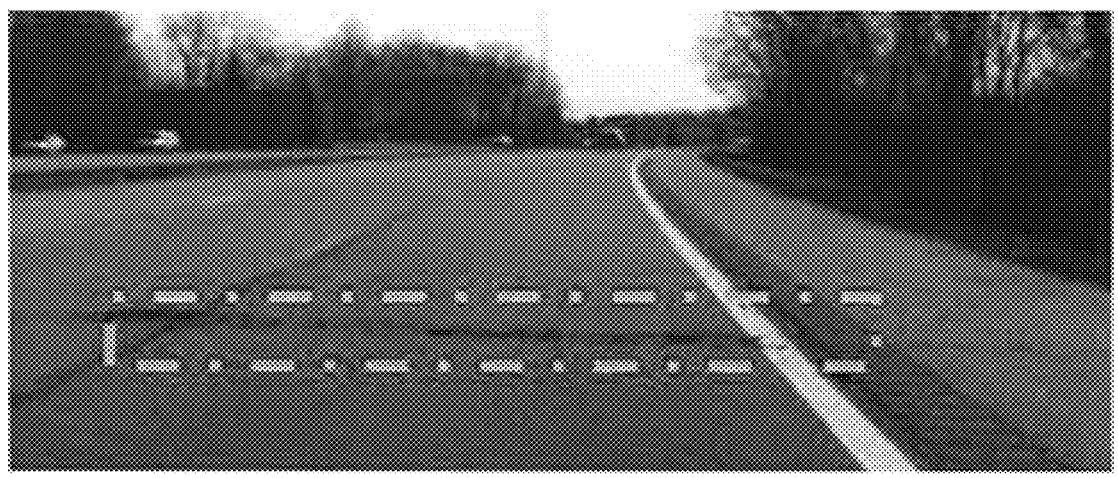
FIG. 27 illustrates an example detection of horizontal line road cracks, in accordance with an example implementation.

Along with detection of potholes and vertical road cracks as shown in the FIG. 26, there is a need to detect horizontal road cracks as shown in FIG. 27. In order to detect such horizontal road cracks, example implementations described herein involve a novel line scan detection module.

Figure 28:
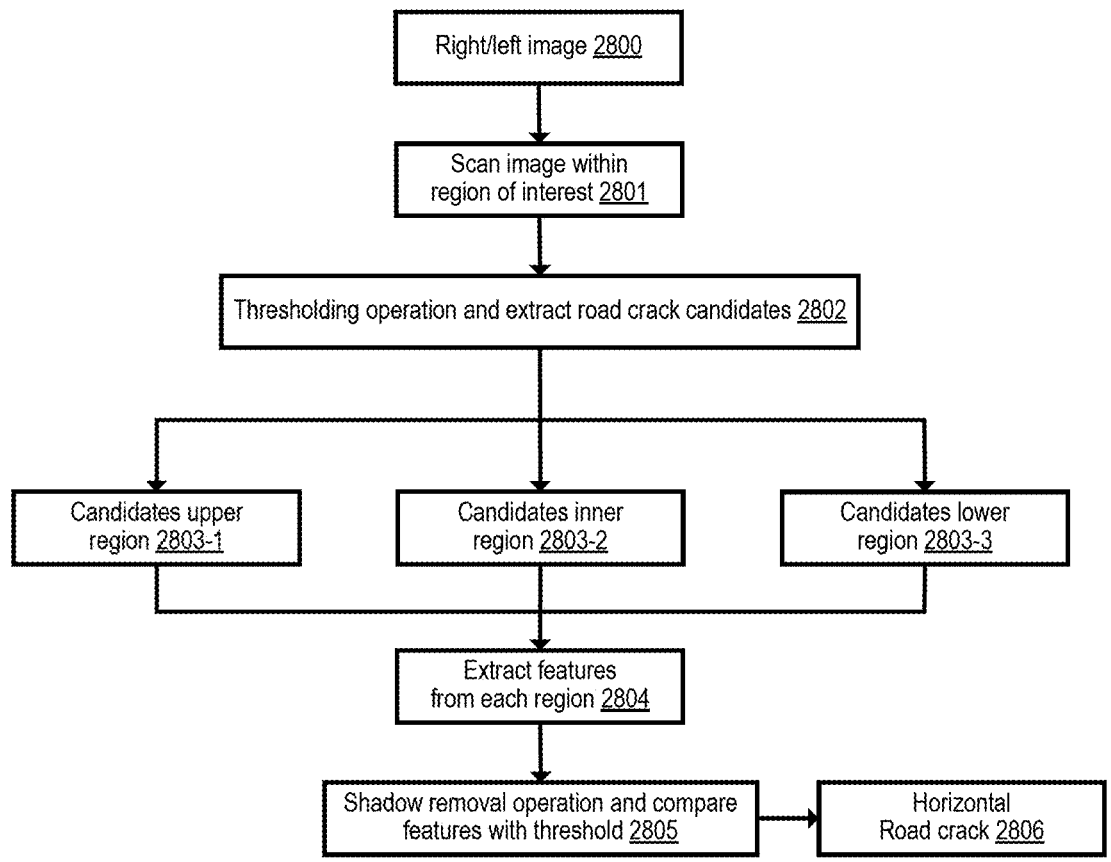
FIG. 28 illustrates an example flow diagram of the line scan detection, in accordance with an example implementation.

FIG. 28 illustrates an example flow diagram of the line scan detection, in accordance with an example implementation. At 2800, the right/left image is provided. At 2801, the image is scanned within the region of interest. Initially, candidate extraction is done by scanning the ROI using vertical lines (e.g., 16 vertical lines). Since the objects that need to be detected have a larger width than other potholes, a down sampling in horizontal direction is possible. This reduces the amount of memory as well as the processing time needed to scan the image.

To extract a candidate, a threshold operation is done at 2802 to extract road crack candidates. In an example implementation the position of pixels with intensity smaller than average ROI intensity minus a threshold (e.g., 20) is retained and all other pixels are discarded. FIGS. 29(*a*) and 29(*b*) illustrate an example input (FIG. 29(*a*)) and output (FIG. 29(*b*)) of candidate extraction, in accordance with an example implementation.

Line Scan Module 1110—Classification

FIG. 30 illustrates an example of region dividing to determine horizontal road cracks, in accordance with an example implementation. Once the candidates are extracted, by using depth classifier and intensity information horizontal road cracks are detected through using feature extraction at 2804. The intensity information is used to remove shadows, and the depth classifier is used to detect the depth at 2805, with the resulting features utilized as horizontal road cracks at 2806. To remove the shadows, extracted candidates are divided into at least three regions, upper region 2803-1, inner region 2803-2, and lower region 2803-3 as illustrated in FIG. 30. Here, number of free rows depends on distance and vehicle speed.

To conduct the statistical analysis and classification of 2805 to detect the horizontal road cracks at 2806, the following flow is performed.

a. Analyze the distribution of intensity at each regions separately, wherein the distributions are compared with each of the other regions and finally with the inner regions.

b. Analyze lightening conditions through the formula:

$$\frac{\text{inner region mean value}}{\text{outer region mean value}} < 0.000316 * (A - B) + 0.56$$

A=Variance inside candidate's bounding box
B=Variance inside candidate's inner region c. Compare each of the features with a specific threshold (e.g., calculated using previously analyzed data by statistical analysis).

d. Based on specified threshold conditions, results are utilized along with depth classifier results, and the current candidates are classified as either horizontal road cracks or shadows/flat road.

Tracking Detected Candidates 306 and Display Output 307

Figure 31:
FIG. 31 illustrates an example of display output, in accordance with an example implementation.

Once the candidates are detected, the candidates are tracked for the rest of the frames and corresponding dimension information will be displayed on the output. Based on the vehicle speed, location and the size of the pothole, the system determines and sends the necessary command to the Electronic Controller Unit (ECU) for avoiding the pothole or for changing the damping and/or spring coefficient of suspension system. For every route, the system will provide the number of pothole/road cracks, their locations and size to map/route generation system to use the data for future route generation preference. FIG. 31 illustrates an example of display output 307, in the form of an output of a line scan detection.

Example Implementation—Using Negative Gaussian Distributions to Classify Depressions and Blind Spots within Depressions FIG. 32(*a*) illustrates depression detection system for a depression having a visible and a blind area of the depression. As illustrated in FIG. 32(*a*) when detecting such depressions there may be a blind area of the depression due to how the camera system of the vehicle is oriented when it is receiving images of the roadway. From the camera system perspective, the example implementations can determine the depth information for the regions where depth information is available. However, such depressions may also have a blind area in which depth information may not be available. To compensate for the blind areas of the depression and determine the true depth of the depression, example implementations described herein utilize an inverted Gaussian curve (i.e., a negative Gaussian distribution) to estimate the depth of the depression and the depression curve. In example implementations, a negative Gaussian distribution is utilized to estimate the depths of the depressions as a large majority of roadway depressions tend to be in some form of a negative Gaussian shape.

FIG. 32(*b*) illustrates an example flow diagram for blind area classification in accordance with an example implementation. From the example implementations described herein, at first the depth classifiers provide the estimated depth of the depression for each pixel from the visible regions at 3201, as well as the estimated depression curve for the visible region at 3202.

At 3203 the estimated depression depth ('-' ve) is determined and the slope of the depression is estimated at each pixel in the x position in a 3D Plane. The slope of the depression can be determined from the estimated depression depths of the pixels for the visible region as illustrated in FIG. 32(*c*), which illustrates examples of different regions of depressions and the estimations in accordance with an example implementation. Based on the slope of the depression and the estimated depression curve, curve fitting according to a negative Gaussian distribution can be conducted for estimating the blind area through applying the negative Gaussian distribution to the estimated curve and slope, as shown in the approximated curve fitting of FIG. 32(*c*). Once the blind area is estimated, the depth of the blind area can also be estimated at 3206 according to the estimated blind area and the slope of depression.

At 3205, a correction factor is applied to the estimated depth in the blind area of 3206, based on the difference of depth pixel—P1 (depth pixel determined from a previous frame—blind area) and depth pixel—P1 (depth pixel determined from the current frame—and now in the visible area), to update the characteristics of the depression based on new images received in real time.

Once the depth in the blind area is estimated, the area of the blind region of the depression is estimated based on the depth information. FIG. 32(*d*) illustrates an example sample image of depression candidate with approximated depression depth in accordance with an example implementation. Thus, the characteristics of a depression, including its depth, can be more accurately estimated through accounting for the blind area of the camera system.

Decision Table for Vehicle Controller System

FIG. 33 illustrates an example decision table for a vehicle controller system, in accordance with an example implementation. When the characteristics of the upcoming depression are estimate based on the flow of FIG. 32(*b*), for example, the vehicle controller can classify the depression into one or more types, and then control at least one of speed, suspension, or steering of the vehicle accordingly. In an example implementation, depressions can be classified based on depression depth (too deep, intermediate, shallow or other in accordance with the desired implementation) and/or depression size (e.g., big, medium, small, or other in accordance with the desired implementation), and distance (near, far, as set in accordance with the desired implementation).

As illustrated in FIG. 33, depending on the classification, speed, suspension, and steering can be controlled according to the desired implementation. For example, if an incoming depression is classified as being large and deep, the depression can be considered to be dangerous, and thus the speed of the vehicle is reduced while the steering is controlled to execute a lane change or other evasive maneuver if such can be conducted safely. On the other hand, if the incoming depression is classified as being medium sized and medium depth, then the suspension (e.g., the spring, the damping coefficient) is adjusted by the vehicle controller to prepare against hitting a depression according to the desired implementation. The decision table can be modified according to any desired implementation for any vehicle. Additionally, warning signals can be provided by the vehicle when such depressions are detected and classified in accordance with the desired implementation. In case of multiple depressions in different lanes, example implementations herein can be configured to detect all of the depression and categorize accordingly. Based on depression types (size and depth) example implementations can also involve sending appropriate control signals to the vehicle to use specific lanes so that maximum safety and comfort is achieved. For example, if depressions are detected across all lanes, example implementations can determine the lane having the depression with the lowest size/depth, adjust the configuration of the vehicle, and instruct the vehicle to steer to that lane for safety and comfort. Example implementations may also select the lane having no depression if such a lane is available, wherein the vehicle is steered to the lane having no depression. In another example implementation, the vehicle can adjust the speed and suspension even if the detected depression is in another lane in case if the driver needs to utilize that lane manually.

Figure 34A:
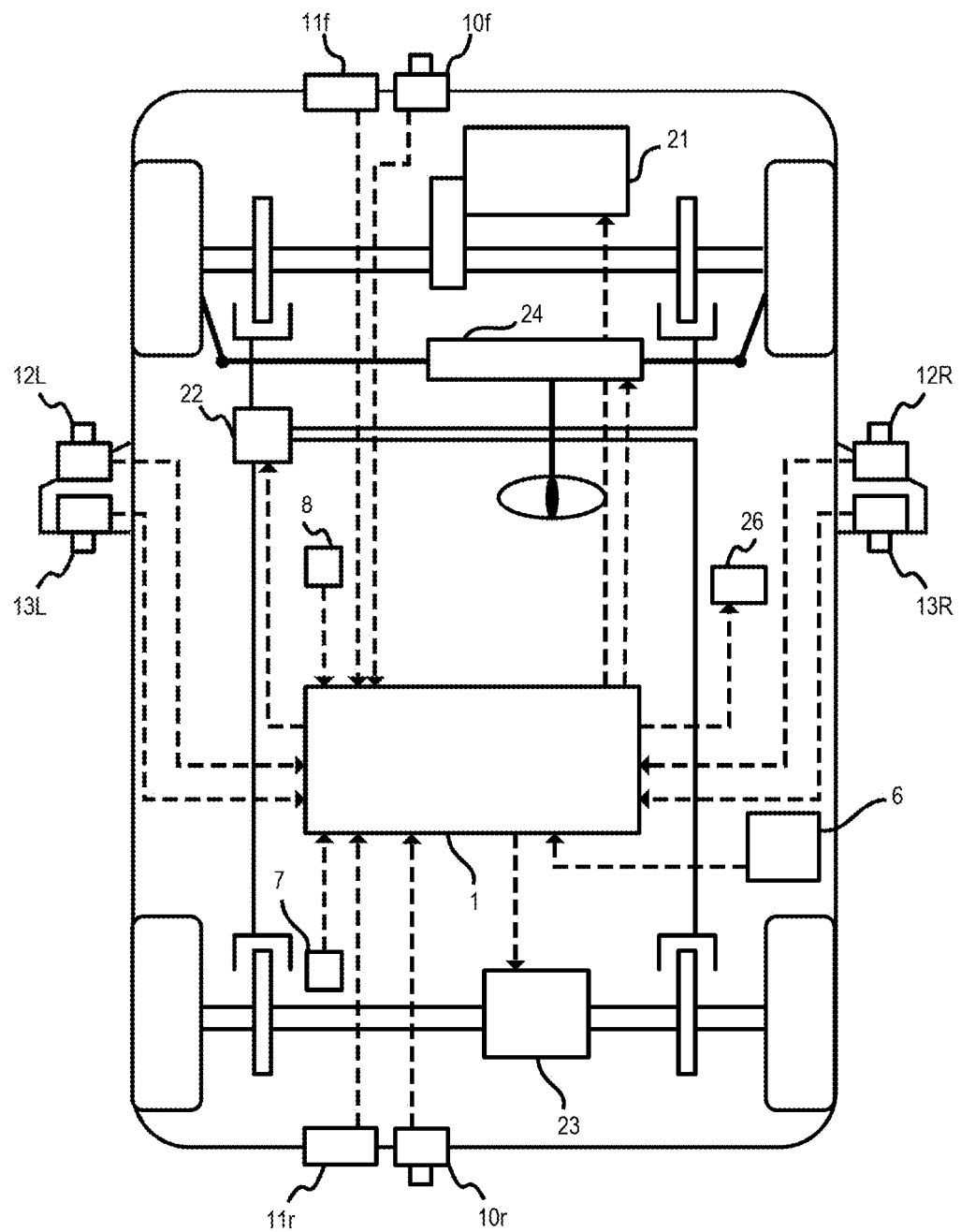
FIG. 34(a) illustrates a vehicle system, in accordance with an example implementation.

FIG. 34(*a*) illustrates a vehicle system, in accordance with an example implementation. Specifically, FIG. 34(*a*) illustrates an example human operated vehicle system configured to operate in a human operated mode and an autonomous mode. The ECU 1 is connected to a map positioning unit 6 to receive signals from the map positioning unit 6. Those signals represent a set route, map data, the position of the vehicle on a map, the direction of the vehicle, lane information, such as the number of lanes, speed limit, types of roads/vehicle locations (e.g., highways and general motorways, branch roads, toll booths, parking lots or garages, etc.), and as applicable, one or more known depressions for a given roadway as received from a cloud system or other vehicles.

The vehicle is provided with an operation parameter measuring unit for measuring values of parameters indicating the operating condition of the vehicle, which can include wheel speed measuring device 7, and vehicle behavior measuring device 8. Signals provided by those devices are sent to the ECU 1. The vehicle behavior measuring device 8 measures longitudinal acceleration, lateral acceleration and yaw rate.

The vehicle is provided with environmental condition measuring devices for measuring conditions of the environment around the vehicle, including a front camera 10*f*, a front radar 11*f*, a rear camera 10*r*, a rear radar 11*r*, a left front camera 12L, a right front camera 12R, a left rear camera 13L and a right rear camera 13R. Those environmental condition measuring devices send information about lane marks, obstacles, and asymmetrical markers around the vehicle to the ECU 1.

The cameras of the vehicle can be in the form of surround eye cameras, a single camera, a stereo camera system, or other cameras depending on the desired implementation. In the camera system of the vehicle, the front camera 10*f* is provided with an image pickup unit for obtaining an image the roadway, and an output unit that provides the images received of the roadway. The front radar 11*f* detects and locates other vehicles and pedestrians and provides signals representing positional relation between the vehicle and those objects. The rear camera 10*r*, the left front camera 12L, the right front camera 12R, the left rear camera 13L and the right rear camera 13R are similar in functionality to the front camera 10*f*, and the front radar 11*f* and the rear radar 11*r*.

The vehicle is provided with an engine 21, an electronically controlled brake system 22, an electronically controlled differential mechanism 23, and an electronically controlled steering system 24. The ECU 1 gives drive signals to actuators included in those systems 22, 23 and 24 on the basis of values of manipulated variables given by the driver and/or environmental conditions such as the detection of various types of depressions or engagement of various autonomous modes for the vehicle system as described herein, for example, according to the vehicle control system table of FIG. 33 or based on instructions received from an on board computer. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the ECU 1 gives a turn signal to at least one of the electronically controlled brake system 22, the electronically controlled differential mechanism 23 and the electronically controlled steering system 24. ECU 1 may also similarly configure the spring coefficient or other parameters of the suspension, as well as steering in accordance with the desired implementation.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle. The electronically controlled differential mechanism 23 drives an electric motor or a clutch to generate a torque difference between the right axle and the left axle in response to a turning request to apply a yawing moment to the vehicle. The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds and turns on warning lights representing information about supporting operations according to the type of the driving support operation. The information output unit 26 is, for example, a monitor provided with a built-in loud speaker. Plural information output units may be installed in the vehicle.

The system as illustrated in FIG. 34(*a*) is an example implementation of the vehicle system as described herein, but other configurations are also possible and fall within the scope of the example implementations, and the present disclosure is not limited to the configuration as illustrated in FIG. 34(*a*). For example, cameras may be installed on the top or the roof of the vehicle for the purposes of detecting depressions on the roadway. Camera system may be a single camera coupled with a machine learning process configured to generate difference images based on the images received from the single camera, or multiple cameras such as a stereo system.

FIG. 34(*b*) illustrates a plurality of vehicle systems and a management apparatus, in accordance with an example implementation. One or more vehicle systems 101-1, 101-2, 101-3, and 101-4 as described with respect to FIG. 34(*a*) are communicatively coupled to a network 100 which is connected to a management apparatus 102. The management apparatus 102 manages a database 103, which contains data feedback aggregated from the vehicle systems in the network 100. In alternate example implementations, the data feedback from the vehicle systems 101-1, 101-2, 101-3, and 101-4 can be aggregated to a central repository or central database such as proprietary databases that aggregate data from systems such as enterprise resource planning systems, and the management apparatus 102 can access or retrieve the data from the central repository or central database. Such vehicle systems can include human operated vehicles such as cars, trucks, tractors, vans, and so on depending on the desired implementation.

In example implementations, the management apparatus 102 functions as a cloud system that is implemented to record instances of depressions that are detected on roadways by the one or more vehicle systems 101-1, 101-2, 101-3. The one or more vehicle systems 101-1, 101-2, 101-3 can transmit such information via a network interface that connects the vehicle system to the management apparatus 102.

Further, the management apparatus 102 can provide information regarding previously detected instances of depressions and their locations on a roadway corresponding to a particular vehicle system depending on the desired implementation. For example, in weather conditions in which the depressions may be partially filled in or otherwise rendered difficult to detect due to poor visibility (e.g., rainwater, snow, or leaves filling in the depression, heavy fog, darkness, etc.), the vehicle system utilizes the previously detected instances of depressions from the management apparatus 102 to be incorporated to assist in the detection and/or control the vehicle according to the vehicle controller table of FIG. 33. For example, if the vehicle systems fail to identify the one or more candidate depressions on the roadway, the vehicle system can use the obtained locations of depressions on the roadway and the types of depressions for each of the obtained depressions as replacement for the detection.

Depending on the desired implementation, management apparatus 102 can provide other updates to the managed vehicle systems 101-1, 101-2, 101-3, such as, but not limited to, updated thresholds or parameters (e.g., pixel intensity threshold, updated machine learning algorithms for single camera systems, updated vehicle control system tables etc.). For example, depending on the location of the vehicle (e.g., vehicle is on dirt road, or in location in which road quality is poor), management apparatus can transmit differing thresholds and vehicle control system tables to manage the vehicle system based on the location.

Figure 34B:
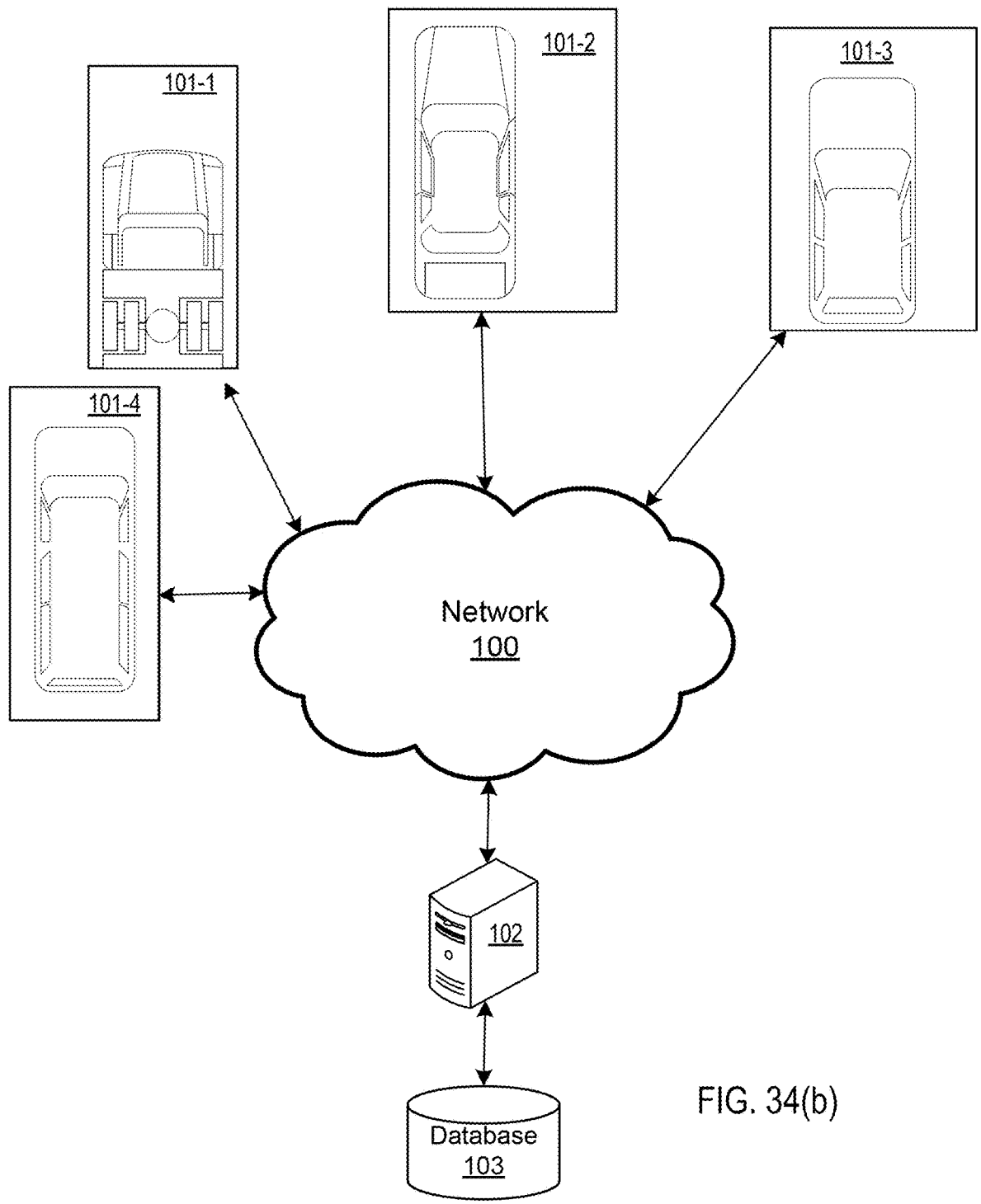
FIG. 34(b) illustrates a plurality of vehicle systems and a management apparatus, in accordance with an example implementation.
Figure 35:
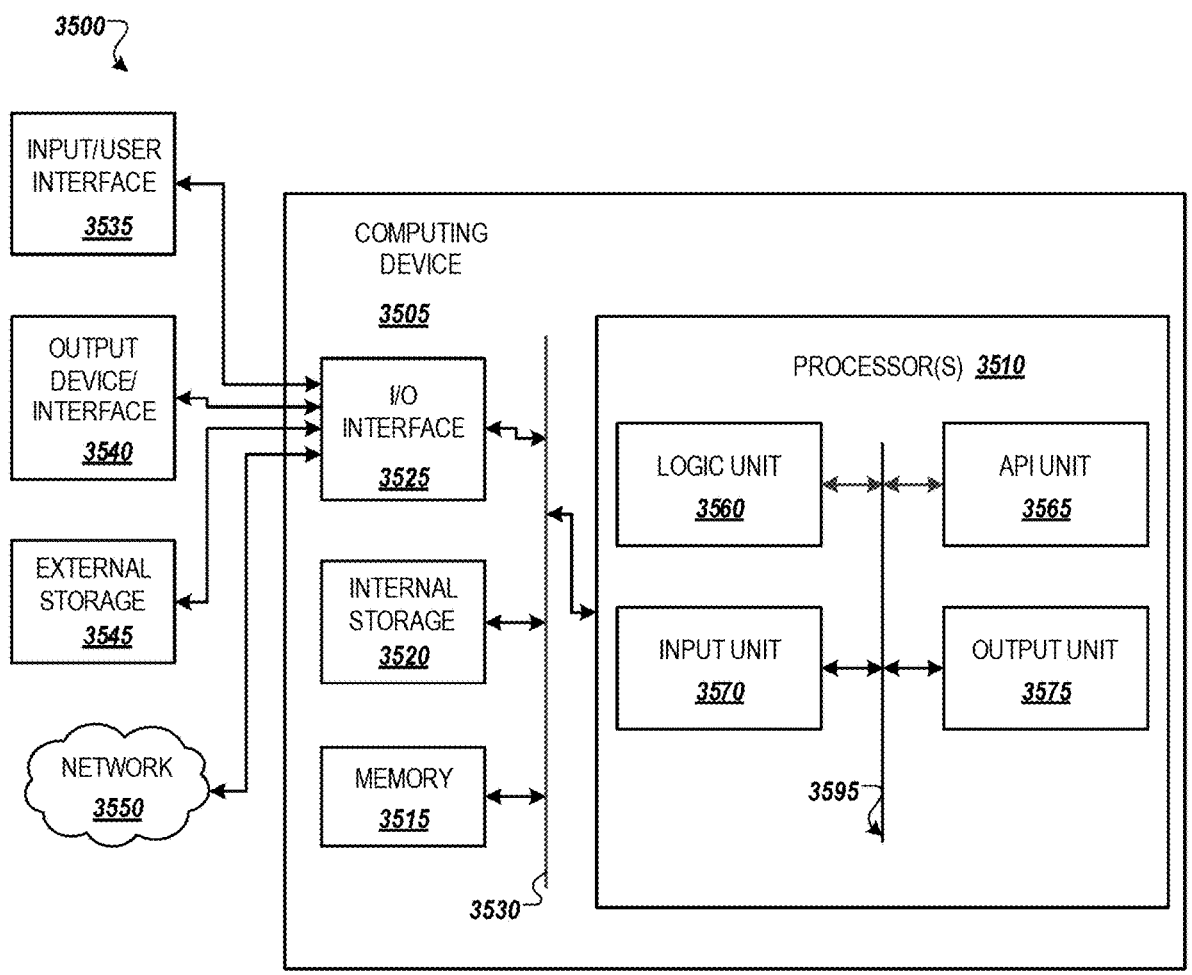
FIG. 35 illustrates an example computing environment with an example computer device suitable for use in some example implementations.

FIG. 35 illustrates an example computing environment with an example computer device suitable for use in some example implementations, such as for facilitating functionality for an on-board computer of a vehicle system to interact with an ECU 1 and map positioning unit 6 of a vehicle system as illustrated in FIG. 34(*a*), or a management apparatus 102 as illustrated in FIG. 34(*b*). All functions described herein can be implemented at the management apparatus 102, at the vehicle system, or through a system based on some combination of such elements, depending on the desired implementation.

Computer device 3505 in computing environment 3500 can include one or more processing units, cores, or processors 3510, memory 3515 (e.g., RAM, ROM, and/or the like), internal storage 3520 (e.g., magnetic, optical, solid state storage, and/or organic), and/or I/O interface 3525, any of which can be coupled on a communication mechanism or bus 3530 for communicating information or embedded in the computer device 3505. I/O interface 3525 is also configured to receive images from cameras or provide images to projectors or displays, depending on the desired implementation.

Computer device 3505 can be communicatively coupled to input/user interface 3535 and output device/interface 3540. Either one or both of input/user interface 3535 and output device/interface 3540 can be a wired or wireless interface and can be detachable. Input/user interface 3535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 3540 may include a display, television, monitor, printer, speaker, braille, or the like. In some example implementations, input/user interface 3535 and output device/interface 3540 can be embedded with or physically coupled to the computer device 3505. In other example implementations, other computer devices may function as or provide the functions of input/user interface 3535 and output device/interface 3540 for a computer device 3505.

Examples of computer device 3505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 3505 can be communicatively coupled (e.g., via I/O interface 3525) to external storage 3545 and network 3550 for communicating with any number of networked components, devices, and systems, including one or more computer devices of the same or different configuration. Computer device 3505 or any connected computer device can be functioning as, providing services of, or referred to as a server, client, thin server, general machine, special-purpose machine, or another label.

I/O interface 3525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 3500. Network 3550 can be any network or combination of networks (e.g., the Internet, local area network, wide area network, a telephonic network, a cellular network, satellite network, and the like).

Computer device 3505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 3505 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 3510 can execute under any operating system (OS) (not shown), in a native or virtual environment. One or more applications can be deployed that include logic unit 3560, application programming interface (API) unit 3565, input unit 3570, output unit 3575, and inter-unit communication mechanism 3595 for the different units to communicate with each other, with the OS, and with other applications (not shown). The described units and elements can be varied in design, function, configuration, or implementation and are not limited to the descriptions provided.

In some example implementations, when information or an execution instruction is received by API unit 3565, it may be communicated to one or more other units (e.g., logic unit 3560, input unit 3570, output unit 3575). In some instances, logic unit 3560 may be configured to control the information flow among the units and direct the services provided by API unit 3565, input unit 3570, output unit 3575, in some example implementations described above. For example, the flow of one or more processes or implementations may be controlled by logic unit 3560 alone or in conjunction with API unit 3565. The input unit 3570 may be configured to obtain input for the calculations described in the example implementations, and the output unit 3575 may be configured to provide output based on the calculations described in example implementations.

Figure 32A:
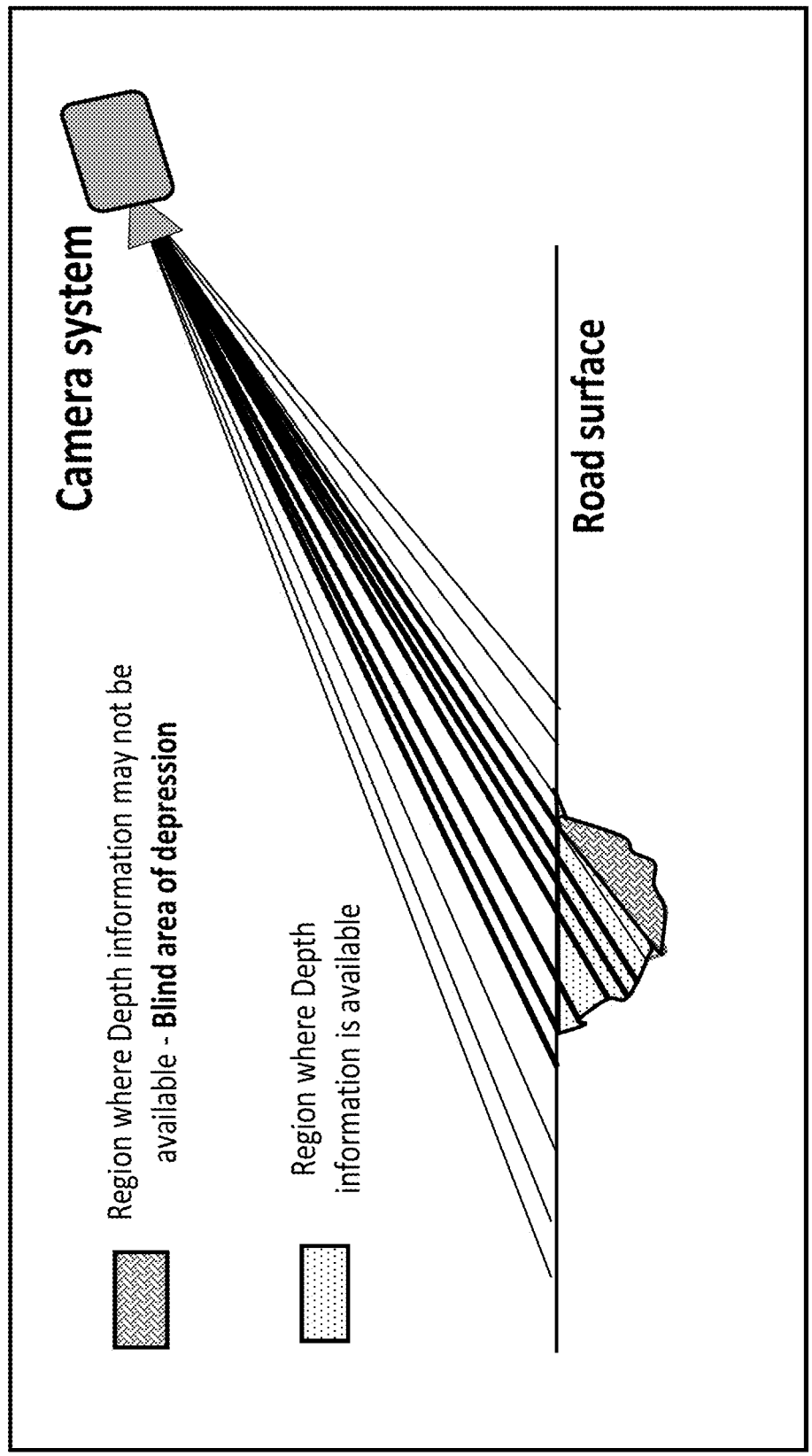
FIGS. 32(a) to 32(d) illustrate a depression detection system for a depression having a visible and a blind area of the depression, in accordance with an example implementation.
Figure 32B:
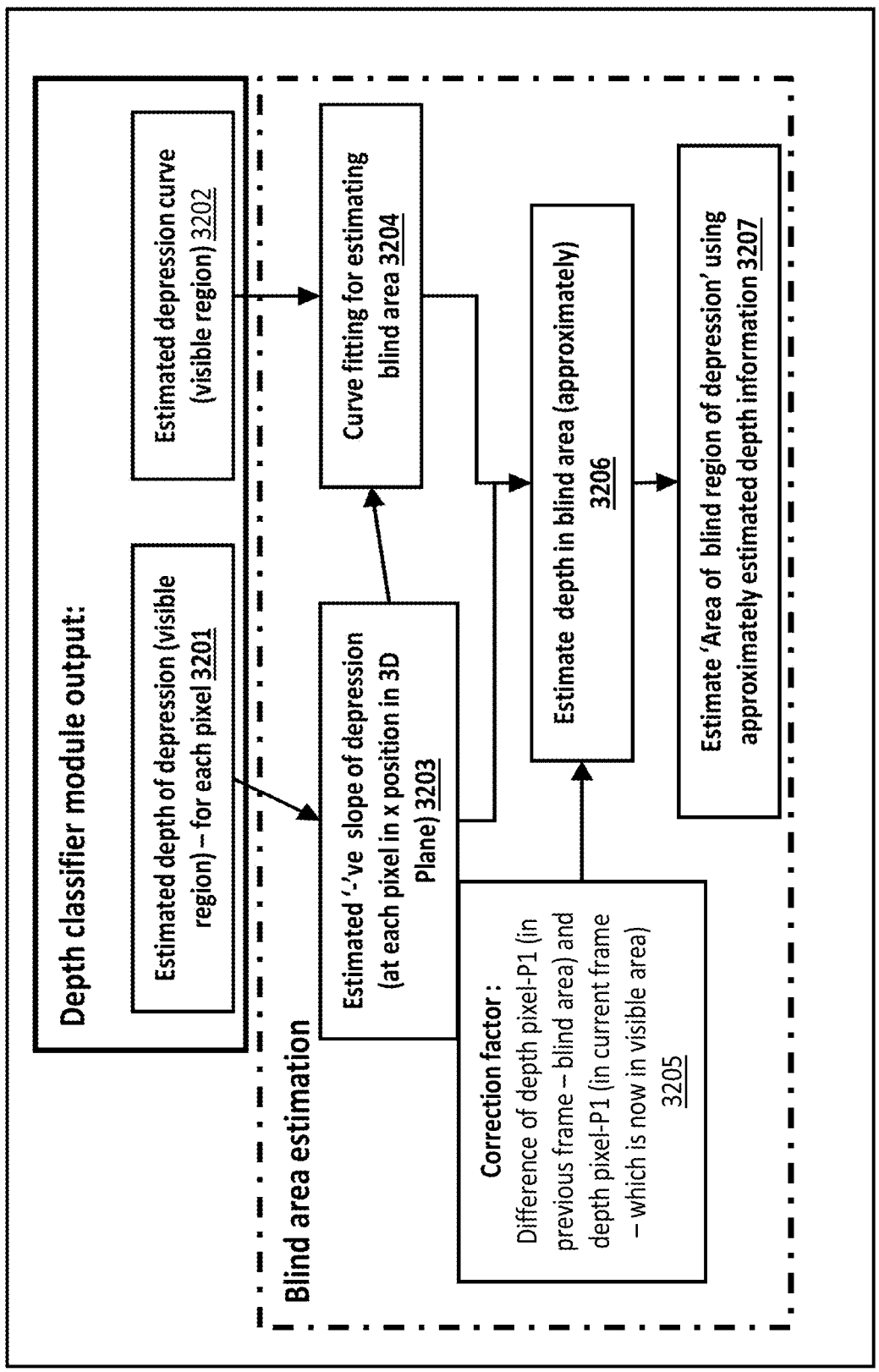
Figure 32C:
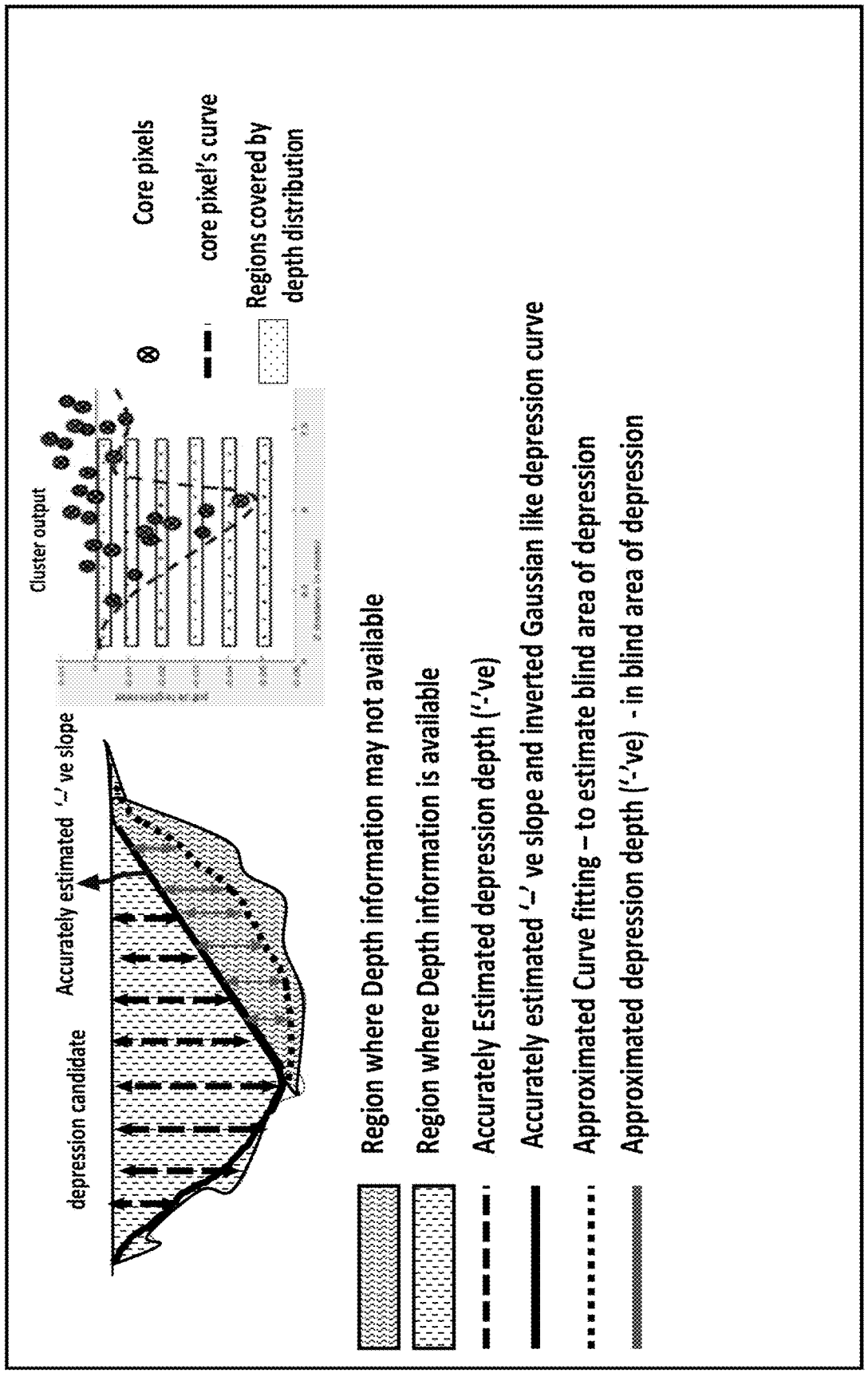
Figure 32D:
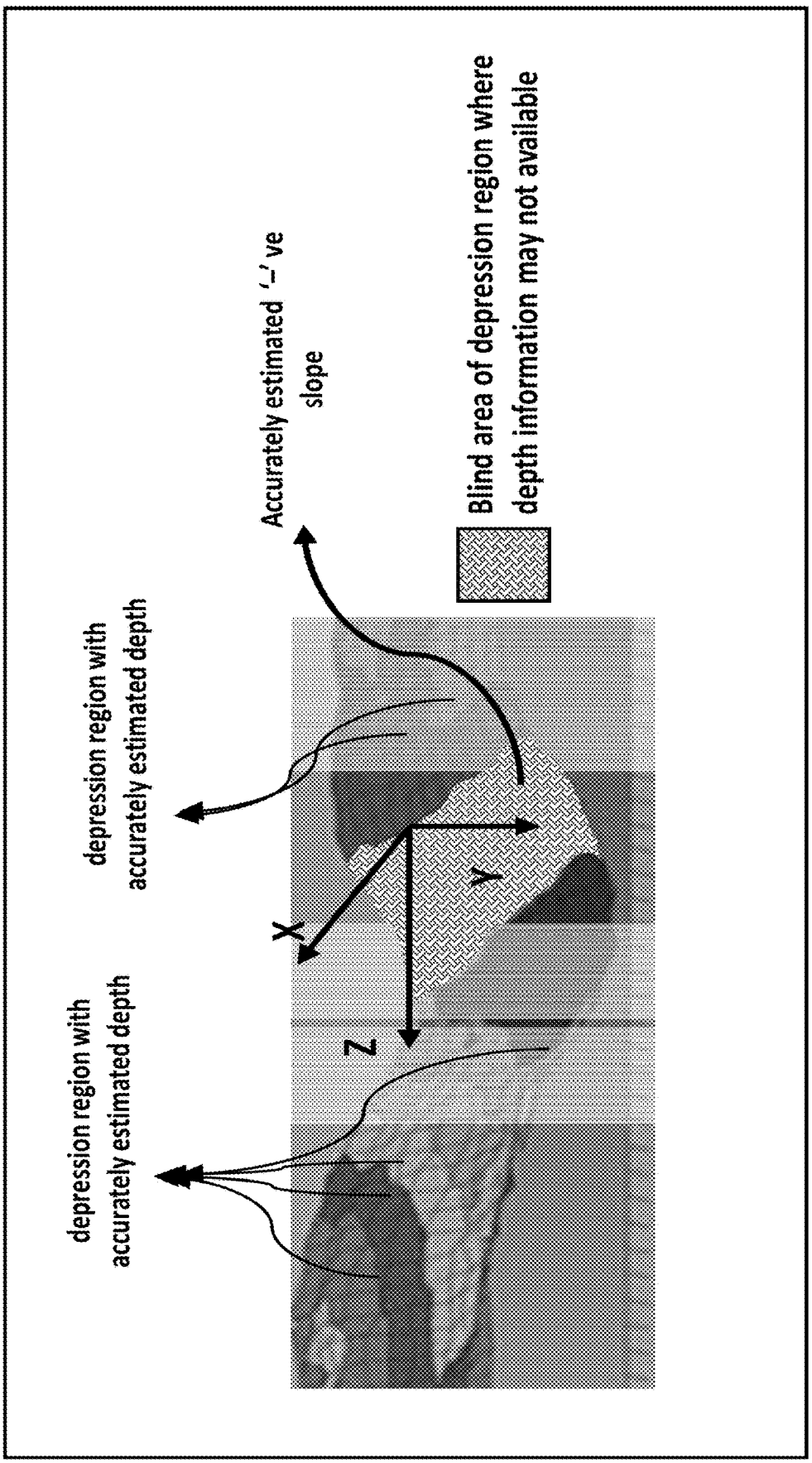

In example implementations of an on board computer, processor(s) 3510 can be configured to determine a difference (i.e. disparity) image for images of a roadway received from one or more cameras of a vehicle as illustrated in FIG. 3, identify one or more candidate depressions on the roadway from the difference image as illustrated in FIG. 3; classify the one or more candidate depressions to determine types of depressions for each of the one or more candidate depressions based on a comparison to a negative Gaussian distribution as illustrated in FIGS. 32(a) to 32(c); and instruct an Electronic Controller Unit (ECU) to control at least one of suspension, steering, or speed of the vehicle system from the determined types of depressions for each of the one or more candidate depressions as illustrated in FIG. 33.

Depending on the desired implementation, for vehicle systems having a single camera, processor(s) 3510 are configured to generate difference image from the images of the roadway received from the camera through a machine learning process. For vehicle systems having a plurality of stereo cameras, the difference image is assembled from the images received from the plurality of stereo cameras as described in FIG. 4.

Processor(s) 3510 can be configured to identify one or more candidate depressions on the roadway from the difference image by comparing edge image pixels of the difference image with a threshold disparity map; associating each of the edge image pixels with a weight based on the comparison; and identifying the one or more candidate depressions based on the weight associated with the each of the edge image pixels as described in FIGS. 3 to 9.

Processor(s) 3510 can be configured to classify the one or more candidate depressions to determine types of depressions for each of the one or more candidate depressions based on the comparison to the negative Gaussian distribution by identifying a blind area of the one or more candidate depressions based on applying the negative Gaussian distribution to an estimated slope of visible pixels of the one or more candidate depressions; estimate a depth of the one or more candidate depressions based on the application of the negative Gaussian distribution; and determining the types of depressions for the each of the one or more candidate depressions based on the estimated depth and an estimated shape of the one or more candidate depressions as illustrated in FIGS. 32(a) to 32(c).

Further, processor(s) 3510 can be configured to for a failure of identifying the one or more candidate depressions on the roadway, obtaining, from a cloud system communicating with the vehicle, locations of depressions on the roadway and the types of depressions for each of the obtained depressions as described with respect to FIG. 34(b).

In example implementations of a management apparatus 102, processor(s) 3510 can be configured to receive locations of one or more candidate depressions on the roadway from one or more vehicle systems associated with the management apparatus 102, and for weather conditions occurring for a location associated with a vehicle system from the one or more vehicle systems (e.g., rain, snow, darkness, fog, etc.), provide the vehicle system associated with the location with the locations of candidate depressions associated with the roadway as described in FIG. 34.

By using the pothole and other depression detection systems described herein as an Advanced Driver Assistant System (ADAS), example implementations can be used to provide safety and comfort driving by adapting the suspension system of the car. Current stereo cameras are utilized with many AD/ADAS applications to assist driver safety. By implementing the example implementations, driver safety can be improved along with providing comfort riding by assisting suspension system. Also, by using location information, particular routes or lanes can be avoided, thereby avoiding damage to the vehicle. Thus, implementing the proposed pothole detection system as described herein enhances the performance of vehicle systems with cameras.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   determining a difference image for images of a roadway received from one or more cameras of a vehicle;
   identifying one or more candidate depressions on the roadway from the difference image;
   classifying the one or more candidate depressions to determine types of depressions for each of the one or more candidate depressions based on a comparison to a negative Gaussian distribution; and
   controlling at least one of suspension, steering, or speed of the vehicle from the determined types of depressions for each of the one or more candidate depressions;
   wherein the classifying the one or more candidate depressions to determine types of depressions for each of the one or more candidate depressions based on the comparison to the negative Gaussian distribution comprises:
      identifying a blind area of the one or more candidate depressions based on applying the negative Gaussian distribution to an estimated slope of visible pixels of the one or more candidate depressions;
      estimate a depth of the one or more candidate depressions based on the application of the negative Gaussian distribution; and
      determining the types of depressions for the each of the one or more candidate depressions based on the estimated depth and an estimated shape of the one or more candidate depressions.

2. The method of claim 1, wherein the one or more cameras is a single camera, and wherein the difference image is generated from the images of the roadway received from the camera through a machine learning process.

3. The method of claim 1, wherein the one or more cameras comprises a plurality of stereo cameras, wherein the difference image is assembled from the images received from the plurality of stereo cameras.

4. The method of claim 1, wherein the identifying one or more candidate depressions on the roadway from the difference image comprises:
   comparing edge image pixels of the difference image with a threshold disparity map;

associating each of the edge image pixels with a weight based on the comparison; and identifying the one or more candidate depressions based on the weight associated with the each of the edge image pixels.

5. The method of claim 1, wherein the identifying one or more candidate depressions on the roadway from the difference image comprises:

for a failure of identifying the one or more candidate depressions on the roadway, obtaining, from a cloud system communicating with the vehicle, locations of depressions on the roadway and the types of depressions for each of the obtained depressions.

6. A non-transitory computer readable medium, storing instructions for executing a process, the instructions comprising:

determining a difference image for images of a roadway received from one or more cameras of a vehicle;

identifying one or more candidate depressions on the roadway from the difference image;

classifying the one or more candidate depressions to determine types of depressions for each of the one or more candidate depressions based on a comparison to a negative Gaussian distribution; and controlling at least one of suspension, steering, or speed of the vehicle from the determined types of depressions for each of the one or more candidate depressions;

wherein the classifying the one or more candidate depressions to determine types of depressions for each of the one or more candidate depressions based on the comparison to the negative Gaussian distribution comprises:

identifying a blind area of the one or more candidate depressions based on applying the negative Gaussian distribution to an estimated slope of visible pixels of the one or more candidate depressions;

estimate a depth of the one or more candidate depressions based on the application of the negative Gaussian distribution; and determining the types of depressions for the each of the one or more candidate depressions based on the estimated depth and an estimated shape of the one or more candidate depressions.

7. The non-transitory computer readable medium of claim 6, wherein the one or more cameras is a single camera, and wherein the difference image is generated from the images of the roadway received from the camera through a machine learning process.

8. The non-transitory computer readable medium of claim 6, wherein the one or more cameras comprises a plurality of stereo cameras, wherein the difference image is assembled from the images received from the plurality of stereo cameras.

9. The non-transitory computer readable medium of claim 6, wherein the identifying one or more candidate depressions on the roadway from the difference image comprises:

comparing edge image pixels of the difference image with a threshold disparity map;

associating each of the edge image pixels with a weight based on the comparison; and identifying the one or more candidate depressions based on the weight associated with the each of the edge image pixels.

10. The non-transitory computer readable medium of claim 6, wherein the identifying one or more candidate depressions on the roadway from the difference image comprises:

for a failure of identifying the one or more candidate depressions on the roadway, obtaining, from a cloud system communicating with the vehicle, locations of depressions on the roadway and the types of depressions for each of the obtained depressions.

11. A vehicle system, comprising:

one or more cameras; and a processor, configured to:

determine a difference image for images of a roadway received from one or more cameras of a vehicle;

identify one or more candidate depressions on the roadway from the difference image;

classify the one or more candidate depressions to determine types of depressions for each of the one or more candidate depressions based on a comparison to a negative Gaussian distribution; and instruct an Electronic Controller Unit (ECU) to control at least one of suspension, steering, or speed of the vehicle system from the determined types of depressions for each of the one or more candidate depressions;

wherein the processor is configured to classify the one or more candidate depressions to determine types of depressions for each of the one or more candidate depressions based on the comparison to the negative Gaussian distribution by:

identifying a blind area of the one or more candidate depressions based on applying the negative Gaussian distribution to an estimated slope of visible pixels of the one or more candidate depressions;

estimate a depth of the one or more candidate depressions based on the application of the negative Gaussian distribution; and determining the types of depressions for the each of the one or more candidate depressions based on the estimated depth and an estimated shape of the one or more candidate depressions.

12. The vehicle system of claim 11, wherein the one or more cameras is a single camera, and wherein the difference image is generated from the images of the roadway received from the camera through a machine learning process.

13. The vehicle system of claim 11, wherein the one or more cameras comprises a plurality of stereo cameras, wherein the difference image is assembled from the images received from the plurality of stereo cameras.

14. The vehicle system of claim 11, wherein the processor is configured to identify one or more candidate depressions on the roadway from the difference image by:

comparing edge image pixels of the difference image with a threshold disparity map;

associating each of the edge image pixels with a weight based on the comparison; and identifying the one or more candidate depressions based on the weight associated with the each of the edge image pixels.

15. The vehicle system of claim 11, wherein the processor is configured to identify one or more candidate depressions on the roadway from the difference image by:

for a failure of identifying the one or more candidate depressions on the roadway, obtaining, from a cloud system communicating with the vehicle, locations of depressions on the roadway and the types of depressions for each of the obtained depressions.

* * * * *